(12) United States Patent
Friedman et al.

(10) Patent No.: US 11,372,854 B2
(45) Date of Patent: Jun. 28, 2022

(54) PROVENANCE ANALYSIS SYSTEMS AND METHODS

(71) Applicant: Smart Information Flow Technologies, LLC, Minneapolis, MN (US)

(72) Inventors: Scott Ehrlich Friedman, Minneapolis, MN (US); Jeffrey Mathew Rye, Minneapolis, MN (US); David Thomas LaVergne, Minneapolis, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 0 days.

(21) Appl. No.: 16/948,297

(22) Filed: Sep. 11, 2020

(65) Prior Publication Data

US 2021/0406257 A1    Dec. 30, 2021

Related U.S. Application Data

(63) Continuation of application No. 16/913,925, filed on Jun. 26, 2020.

(51) Int. Cl.
*G06F 16/245* (2019.01)
*G06F 16/23* (2019.01)
(Continued)

(52) U.S. Cl.
CPC ........ *G06F 16/245* (2019.01); *G06F 16/2379* (2019.01); *G06F 16/252* (2019.01);
(Continued)

(58) Field of Classification Search
CPC .... G06F 16/245; G06F 16/2379; G06N 20/00
See application file for complete search history.

(56) References Cited

U.S. PATENT DOCUMENTS

| | | |
|---|---|---|
| 7,539,753 B2 | 5/2009 | Amini et al. |
| 8,271,461 B2 | 9/2012 | Pike et al. |

(Continued)

OTHER PUBLICATIONS

Weiner Oliveira, et al., "A Framework for Provenance Analysis and Visualization", Procedia Computer Science 108C (2017), pp. 1592-1601.

(Continued)

*Primary Examiner* — Mark D Featherstone
*Assistant Examiner* — Tony Wu
(74) *Attorney, Agent, or Firm* — Young Basile Hanlon & MacFarlane, P.C.

(57) ABSTRACT

Provenance analysis systems and methods. Datums representing relationships between entities can be stored in a knowledge store. Datums can be received from agents as agents perform activities. Activity records are be stored in a provenance graph, the activity record and associate received datums with any input datums used in the activity. Provenance subgraphs can 5 be retrieved by traversing the provenance graph for selected datums and presented through a user interface. Provenance subgraphs can be augmented with trust modifiers determined based on attributions, confidences, and refutations provided by a user. Trust modifiers can be propagated downstream to enable the addressing of junctions in variable confidence.

35 Claims, 19 Drawing Sheets

(51) Int. Cl.
*G06N 20/00* (2019.01)
*G06F 16/25* (2019.01)
*G06F 21/62* (2013.01)
*G06N 5/04* (2006.01)

(52) U.S. Cl.
CPC .............. *G06F 21/62* (2013.01); *G06N 5/04* (2013.01); *G06N 20/00* (2019.01)

(56) References Cited

U.S. PATENT DOCUMENTS

| | | |
|---|---|---|
| 8,838,556 B1 | 9/2014 | Reiner et al. |
| 9,229,952 B1 | 1/2016 | Meacham et al. |
| 9,996,595 B2 | 6/2018 | Bond |
| 10,313,177 B2 | 6/2019 | Radivojevic et al. |
| 2008/0040181 A1 | 2/2008 | Freire et al. |
| 2010/0114628 A1* | 5/2010 | Adler ................... G06Q 10/063 705/7.11 |
| 2010/0287204 A1 | 11/2010 | Amini et al. |
| 2011/0093463 A1* | 4/2011 | Oliver ................ G06F 16/9024 707/737 |
| 2011/0125770 A1* | 5/2011 | Battestini ............... G06Q 10/00 707/758 |
| 2011/0295854 A1* | 12/2011 | Chiticariu ............. G06F 16/313 707/737 |
| 2012/0001917 A1* | 1/2012 | Doganata ............. G06Q 10/101 345/440 |
| 2012/0327087 A1* | 12/2012 | Fonseca Da Trindade ................ G06T 11/206 345/440 |
| 2013/0238316 A1* | 9/2013 | Shastri .................... G06F 40/10 704/9 |
| 2013/0332423 A1 | 12/2013 | Puri et al. |
| 2014/0310285 A1 | 10/2014 | Chan et al. |
| 2016/0283849 A1* | 9/2016 | Kozloski ................ G06Q 10/06 |
| 2017/0090994 A1 | 3/2017 | Jubinski et al. |
| 2019/0114335 A1 | 4/2019 | Koenig et al. |
| 2019/0121979 A1 | 4/2019 | Chari et al. |
| 2019/0171979 A1* | 6/2019 | Devarakonda ....... G06Q 10/067 |
| 2019/0213260 A1 | 7/2019 | Bacarella et al. |
| 2020/0059481 A1* | 2/2020 | Sekar .................. H04L 63/1416 |

OTHER PUBLICATIONS

Weiner, Oliveira, et al., "A Framework for Provenance Analysis and Visualization", Procedia Computer Science 108C, (2017), 1592-1601.

U.S. Appl. No. 16/913,925, filed Jun. 26, 2020, Provenance Analysis Systems and Methods.

"U.S. Appl. No. 16/913,925, Non Final Office Action dated Dec. 27, 2021", 28 pgs.

"U.S. Appl. No. 16/913,925, Final Office Action dated May 9, 2022", 18 pgs.

* cited by examiner

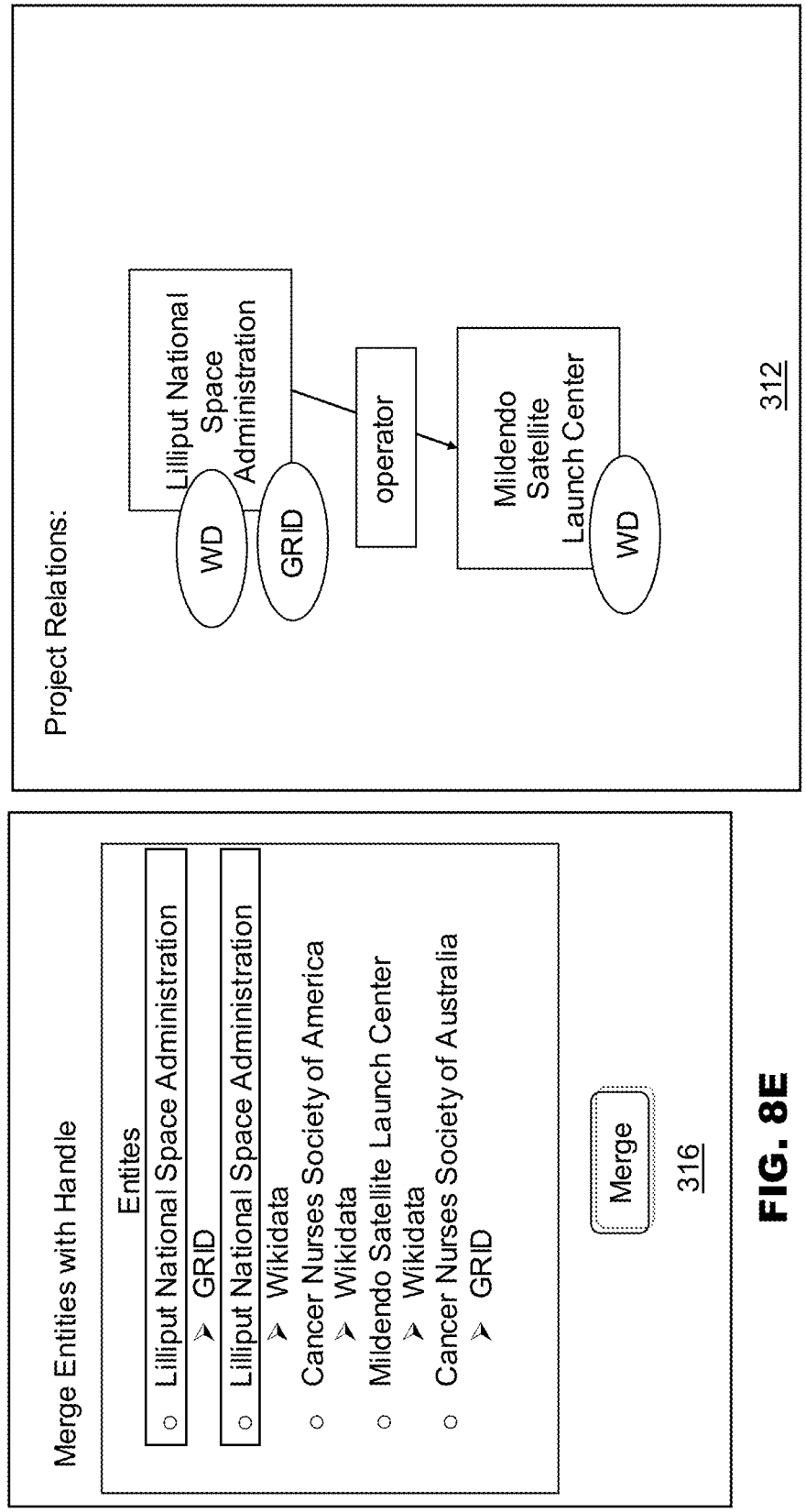

PROVENANCE ANALYSIS SYSTEMS AND METHODS

CROSS-REFERENCE TO RELATED APPLICATIONS

The present application is a continuation of U.S. patent application Ser. No. 16/913,925, filed Jun. 26, 2020, the disclosure of which is fully incorporated by reference herein.

This invention was made with Government support under FA86492000006 awarded by Air Force Research Laboratory (AFRL). The Government has certain rights in the invention.

TECHNICAL FIELD

Embodiments of the present disclosure relate generally to the field of information analysis and visualization, and more particularly to the tracking and visualization of provenance metadata generated during an information analysis process.

BACKGROUND

Experts in information-rich domains increasingly depend on specialized tools to process data and generate insights. These tools, which can be referred to as software agents, can expedite the work, but may also reduce accuracy, increase risk, increase bias, and increase complexity as more, and more diverse, agents are used in the analysis process.

Despite this increase of risk and complexity, core professional guidelines such as journalistic integrity, legal due diligence, scientific integrity, and U.S. Intelligence Community Directives (ICDs) remain stringent. Provenance, as referred to herein, is a form of metadata (or data about data), that records the origin (or origins) of data, the insights developed from that data, and/or the agents involved in the procurement or development of such data. Understanding the provenance of information insights enables the users of the information to also understand the trustworthiness of each insight.

Frameworks, such as the PROV-O data model, exist for tracking provenance. Such frameworks attempt to describe the activities in a workflow and the information that each activity uses and produces. Each activity, whether performed by a human or software agent, can be described as using information produced by previous activities, so these existing provenance frameworks describe a network of activities and information to encode (and display) the lineage and foundations of information.

Such frameworks and conventional systems for visualization of the same, however, are not able to help experts and decision-makers assess the risk, foundations, and confidence of information that was generated by diverse teams of humans and machines.

SUMMARY

Embodiments of the present disclosure provide systems and methods for distributed provenance tracking of information insights generated by activities performed by plurality of agents using a variety of information and data inputs. Embodiments can provide confidence propagation, whereby human and software agents can leave attributions regarding sources, activities, or other agents, to express a level of confidence on any item of information involved in an analysis. The insight generating process can propagate confidence attributions downstream and enable the addressing of junctions in variable confidence.

Embodiments can further enable attribute propagation. The information sources, operations (or activities) performed by agents, and data types can be propagated downstream through a provenance chain, such that users can assess the risks and information sources that contributed to any conclusion or evidence. This can enable users to assess the diversity of evidence used to generate any particular insight.

Embodiments can further provide element refutation. The insights generated, and visualization of the provenance thereof, can be dynamically updated as a user temporarily retracts or refutes any activity, agent, or source from the analysis. This can enable the user to assess the effect of the refutation on the generated insights and assess the sensitivity of the analysis to any individual element.

Element refutation can be on an individual or class basis. Embodiments enable the user to temporarily retract classes or groups of data sources, algorithms, agents, or activities. This can enable the user to assess the sensitivity of the analysis to classes of data and algorithms.

One aspect of the present disclosure provides a provenance analysis system. A knowledge store can be provided to store a plurality of datum records, each datum record comprising a unique datum, the datum comprising an indicator of a relationship between a first entity and a second entity. An agent interface can be configured to receive a datum from an agent and store an activity record in a provenance graph. The activity record can comprise an association with the received datum and any input datums used by the agent to generate the received datum.

A provenance subgraph retriever can be configured to receive a selected datum and retrieve a provenance subgraph for the selected datum by recursively identifying each activity record in the provenance graph associated with the selected datum and each activity record in the provenance graph of any input datum of an activity record associated with the selected datum.

A provenance visualizer can comprise a display and a user input interface for receiving a selection of a datum. The provenance visualizer can be configured to display the retrieved provenance graph.

In embodiments, that agent interface can be further configured to search the knowledge store to determine if a datum record comprising the received datum exists, and in response to determining that a datum record comprising the received datum does not exist, storing a datum record comprising the received datum in the knowledge store.

In embodiments, a confidence propagator can be configured to receive a trust parameter comprising at least one activity attribute, and apply the trust parameter to the provenance subgraph by augmenting each applicable activity record of the provenance subgraph with a trust modifier based on the trust parameter. An activity record of the provenance subgraph can be an applicable activity record if the activity record has an activity attribute that matches an activity attribute of the trust parameter or if the activity record has an input datum that is associated with an applicable activity record.

In embodiments, augmenting each applicable activity record of the provenance subgraph with a trust modifier based on the trust parameter can include, for each activity record found in a search of the provenance subgraph for any activity records having an activity attribute that matches an activity attribute of the trust parameter: calculating a trust modifier value based on the trust parameter and any existing trust modifier value associated with the activity record and iteratively applying the trust modifier to each child activity record having an input datum that is associated with the activity record.

In embodiments, the trust parameter can comprise a confidence value. Calculating a trust modifier value based on the trust parameter and any existing trust modifier value associated with the activity record can include associating a trust modifier value of 1 the activity record if no existing trust modifier value is associated with the activity record the multiplying the confidence value by each trust modifier value associated with the activity record.

In embodiments, the user input interface is can be further configured to receive the trust parameter, and the provenance visualizer can be further configured to alter the display of the provenance subgraph based on the trust modifier of each activity record.

In embodiments, the trust parameter can indicate a confidence in a datum. In embodiments, each activity record can further comprise an identifier of the agent and the trust parameter can include a value indicating a confidence in activities performed by an agent. In embodiments, each activity record can further include a class of the agent and the trust parameter can include a value indicating a confidence in activities performed a class of agents. In embodiments, each activity record further includes a class of operation performed by the agent and the trust parameter can include a value indicating a confidence in a class of operations. In embodiments, each activity record further can include a source of any input datum associated with an activity, and the trust parameter can include a value indicating a confidence in a source.

In embodiments, a conflict detector, the conflict detector can be configured to indicate one or more conflicting datums in the provenance graph.

One aspect of the present disclosure includes a method for visualizing the provenance of a datum record in a knowledge store. The method can include providing a knowledge store for storage of a plurality of datum records, each datum record comprising a unique datum, the datum comprising an indicator of a relationship between a first entity and a second entity, receiving a datum from an agent, and storing an activity record in a provenance graph. The activity record can include an association with the received datum and any input datums used by the agent to generate the received datum.

The method can further include receiving an identifier of a selected datum and retrieving a provenance subgraph for the selected datum by recursively identifying each activity record in the provenance graph associated with the selected datum and each activity record in the provenance graph of any input datum of an activity record associated with the selected datum, and displaying the generated provenance graph, by a provenance visualizer comprising a display and a user input interface for receiving a selection of a datum record.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIGS. 8A-8F are mockups depicting screens of a user agent interface, according to an embodiment.

Figure 1:
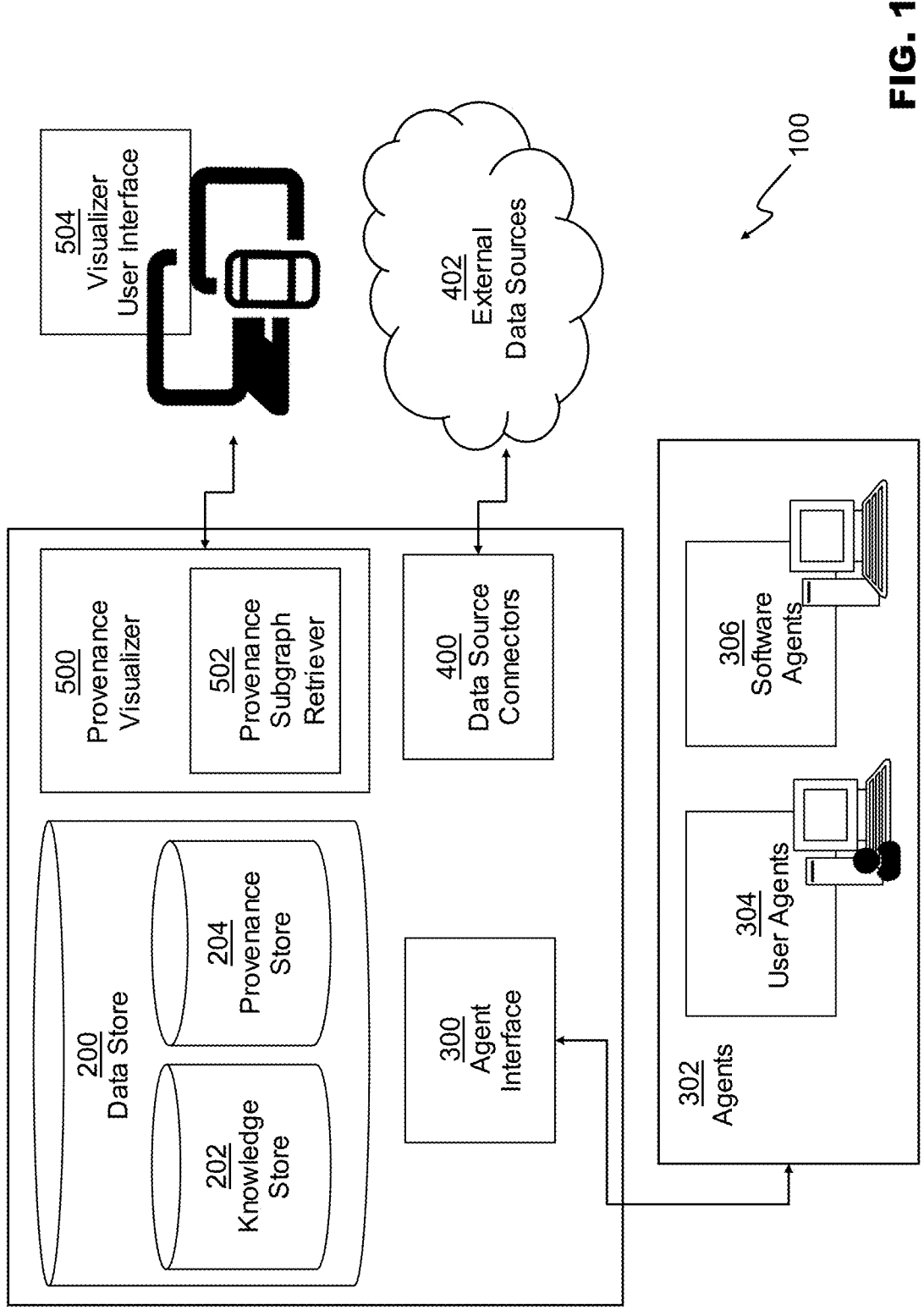
FIG. 1 is a schematic diagram depicting components of a provenance analysis system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a schematic diagram depicting components of a provenance analysis system 100, according to an embodiment. Provenance analysis system 100 can comprise data store 200, agent interface 300, data source connectors 400 and provenance visualizer 500 in embodiments. Components and subcomponents of system 100 are described in more detail below.

The various components and engines of system 100 can reside on, or be executed by, a single computing device in embodiments. In other embodiments, the components and engines of system 100 can reside on, or by executed by, a plurality of computing devices in continuous or intermittent, wired or wireless, data communication with each other such that the systems and methods described herein can be executed in parallel.

System 100 can present one of more user interfaces to various users. Each user interface can be a command line interface, a graphical user interface, a web browser accessible interface, an augmented reality interface, or any other interface that can receive user input and present outputs of system 100 to the user. In an embodiment, each user interface can be a programmatic interface, such that the user can be a computing system, robot, or other electronic device. For example, as described in further detail below, each of user agents 304 and visualizer user interface 504 can comprise a user interface executed by a computing device in association with system 100.

Figure 2:
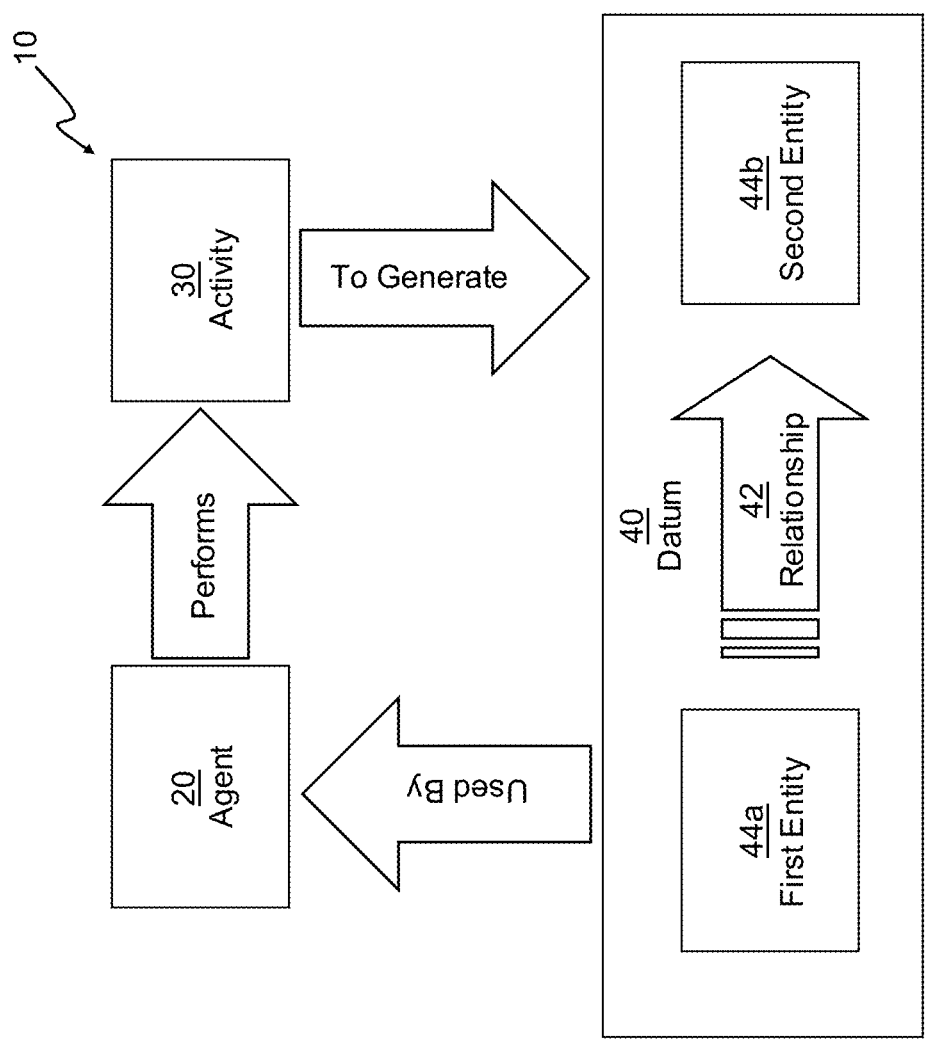
FIG. 2 is a schematic diagram depicting an information analysis cycle, according to an embodiment.

FIG. 2 is a schematic diagram depicting an information analysis cycle 10, which may be supported or implemented by provenance analysis system 100, according to an embodiment. As depicted, an agent 20 can perform an activity 30 using datum 40 as an input. Each datum 40, can be provided to system 100 as an axiom, or generated by one or more activities 30. Embodiments of provenance analysis system 100 may support or implement additional or alternate information analysis cycles.

A datum 40 can represent an item of information about the world, which can be represented by a relationship 42 between a first entity 44a and a second entity 44b. As an example, a datum may represent an assertion that the Earth resolves around the Sun as a tuple: <first entity 44a>, <relationship 42>, <second entity 44b→{"Earth", "revolves around", "Sun"}. Other examples of datums are provided in Table 1 below, which is not intended as an exhaustive set of entities, relationships, or datums, usable by system 100.

TABLE 1

| First Entity | Relationship | Second Entity |
| --- | --- | --- |
| Earth | revolves around | Sun |
| Earth | is a | planet |
| The city of Chicago | is located in | The state of Illinois |
| The state of Illinois | is located in | The United States of America |
| Lady Ada | is a | Ship |
| Lady Ada | is located in | The United States of America |
| Lilliput National Space Administration | operates | Mildendo Satellite Launch Center |

Returning again to FIG. 1, data store 200 can comprise one or more database, file systems, memories, or other data storage systems known in the art. Data store 200 can comprise a single data store, present on a single computing device in an embodiment. In other embodiments, data store 200 may be present on one or more database systems physically separate from other components of system 100. In other embodiments, data store 200 may be present distributed across multiple separate computing devices, each with associated data stores. In embodiments, data store 200 may comprise one or more relational databases with tabular structure, NoSQL, or other non-relational databases with key-value, grid, or other structures.

Data store 200 can comprise logical groupings of data comprising knowledge store 202 and provenance store 204. Numerous types and structures of data, that can be stored, indexed, and through embodiments of data store 200. Where, as depicted or described, data structures are said to include or be associated with other data structures, it should be understood that such other data structures may be stored within or in association with each data structure, or may be referenced by other data structures through the use of links, pointers, or addresses, or other forms of referencing data.

Figure 3:
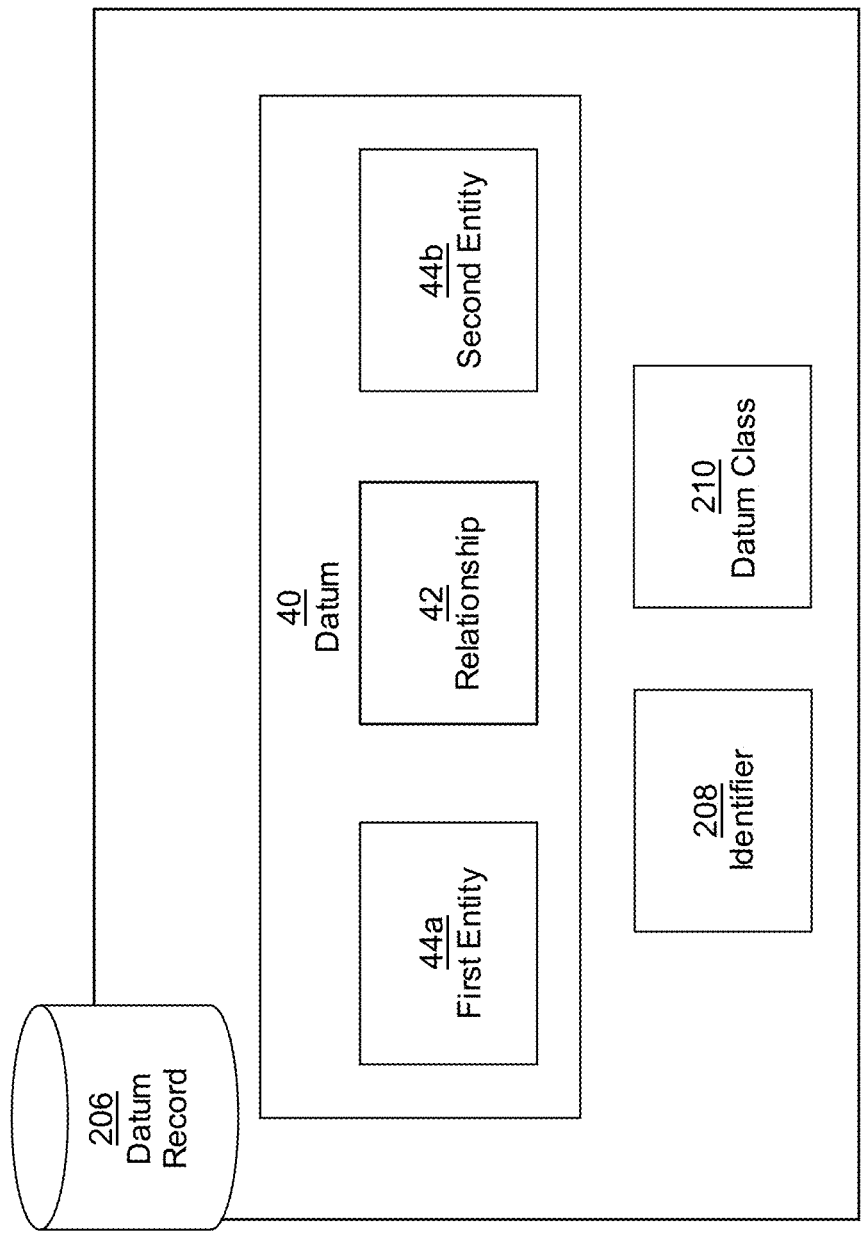
FIG. 3 is a schematic diagram depicting a datum record, according to an embodiment.

FIG. 3 is a schematic diagram depicting a datum record 206 according to an embodiment. Knowledge store 202 can comprise one or more datum records 206. Each datum record can include a datum 40 including relationship 42, first entity 44a, and second entity 44b, as well as a unique identifier 208 and datum class 210. Each of relationship 42, first entity 44a and second entity 44b can be stored as text, numeric, or other data structures within knowledge store 202. In embodiments, knowledge store 202 can comprise on or more tables or other data structures for storing, organizing, arranging, or linking information about relationships 42 and entities 44 as can be received through datums 40. For example, knowledge store 202 can store, receive, and/or provide data in a structured data format such as a WIKIBASE data model.

Each datum record 206 can be generated, read, processed, or analyzed by agents 302. In embodiments, each datum 40 can be associated with exactly one datum record 206, in other embodiments, each datum 40 can be associated with multiple datum records 206. Datums 40 can be stored as separate database elements, and each datum record 206 can comprise a link to the datum 40. In other embodiments, each datum 40 can comprise a set, list, array or other data structure comprising links or references to one or more datum record 206 associated with the datum 40.

Identifier 208 can be a pointer, address, primary key, or other data element useful for uniquely identifying datum record 206. Identifier 208 can be a subject identifier, which can be expressed in a URL-style format, such as "subj:// <context>::<id>, for example, subj://lore:base::guru:JennaAnalyst.

Datum class 210 can be an indicator of what type of information is provided by the datum 40. For example, each datum 40 can be an external data record, or an insight generated or provided by the activities of one or more agents, such as a handle, belief, qualifier, or conflict.

A handle datum can be placeholder for an event, entity, or location in the world (e.g., "Lady Ada," or "United States of America (USA)"). There may be many data sources 402 with entries about each a given entity, and the handle for the entity can enable the user to unify these entries under a common element in order to maintain separation but allow fusion across data sources.

A belief datum can be generated as the result of one or more agent operations, such as an assertion, or an inference.

A conflict datum can comprise a link between two datums that cannot both be true. For example, <Lady Ada, Location, USA> and <Lady Ada, Location, Italy>.

A data entry datum can be an external data entry that can represent or store axiomatic information that is provided to data source connectors 400 from external sources 402 such as databases, sensor feeds, news outlets, or the like.

A qualifier datum can comprise a link between a datum record 206, and one or more other datum records 206 that might qualify the datum record. For example, if an external data record is known to only be valid for a particular time period, any insights generated using the external data record may be qualified based on that date period. As an example, the: <Lady Ada, Location, USA> datum may have an associated qualifier datum that indicates that this is only known for a time period of May 15, 2019-May 22, 2019.

Figure 4:
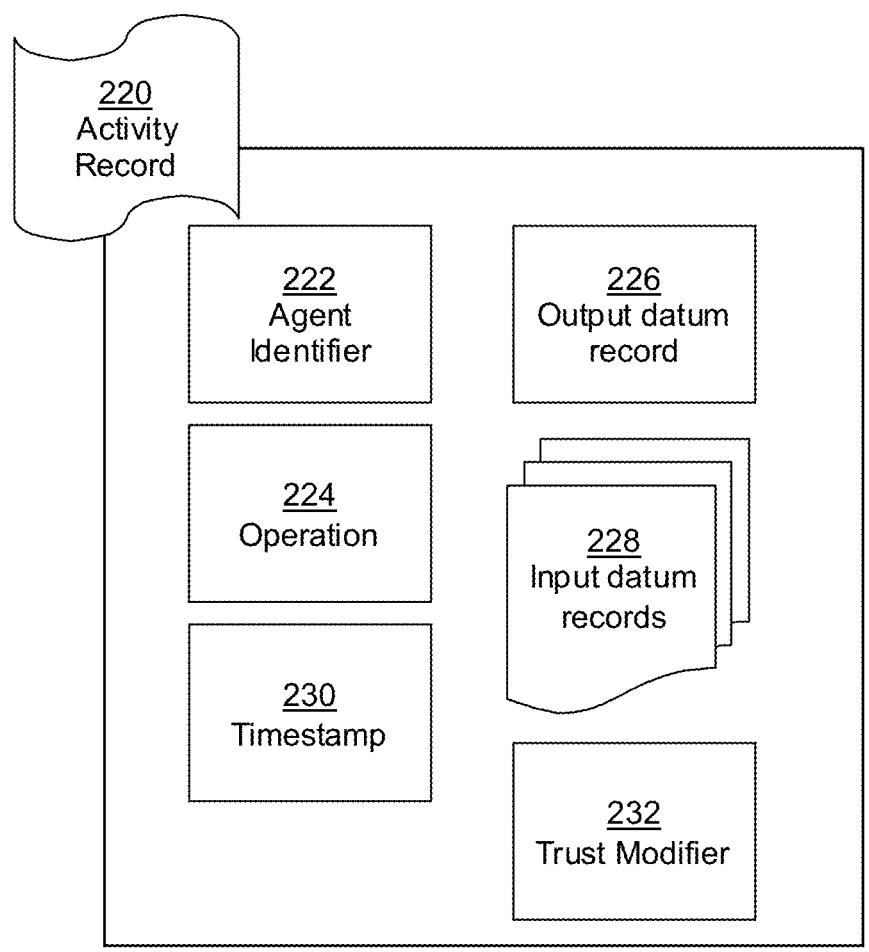
FIG. 4 is a schematic diagram depicting an activity record, according to an embodiment.

FIG. 4 is a schematic diagram depicting the data structure of an activity record 220 according to an embodiment. Provenance data store 204 can provide storage for activity records 220. Activity record 220 can represent or store information regarding a particular instance of an activity or operation that was executed on the system to produce a datum 40. Each activity record 220 can include an agent identifier 222 identifying the agent 302 associated with the activity, information about the operation 224 performed, output datum record link 226 associating the activity record 220 with the datum record(s) generated by the activity, and input datum record links 228 associating the activity record with any datum records 206 used by the agent 302 during performance of the activity. Each activity record 220 can further include timestamp 230 and trust modifier 232. Activity records 220 can comprise data entries compatible with the PROV-O ontology or other data format compatible with the PROV data model.

Operation 224 can be a label recording the name or class of operation performed. Operation classes supported by system 100 can include: ingest operations, inference operations, and assertion operations in an embodiment.

Ingest (or ingestion) operations can be performed by agents 302 to process one or more external data sources 402 to generate one or more datum records 206. For example, a Wikidata Agent can be configured to ingest a data source structured according to a WIKIBASE data model to create datum record 206 for each of a set of keywords.

Assertion operations can be performed by agents 302 to provide one or more datum records 206 directly. A user agent 304 can enable a user to assert one or more facts that can be recorded as datum records 206. For example, a user may assert that a certain ocean-going vessel was in a particular harbor on a particular date because the user saw the vessel in that harbor, or because the user received other information that supports the assertion.

Inference operations can be performed by agents 302 to produce belief records based on datum records 206 and one or more rules. Inferences operations can include parsing text for certain words as well as inferring links based on user or machine generated rules.

The various operations performed by agents 302 can further be categorized by particular processing methods or sources of data. For example, in embodiments, operation categories can include open source intelligence (OSINT), social intelligence (SOCINT), social media intelligence (SMINT), human intelligence (HUMINT), signals intelligence (SIGINT), measurement and signatures intelligence (MASINT), geospacial intelligence (GEOINT), or other technical intelligence disciplines. In addition, operation categories can include processing types such Gaussian, Bayesian, or other statistical filtering, or various machine-learning techniques such as supervised, unsupervised, or reinforcement learning. In embodiments, operations or the agents performing them can be categorized based on particular machine-learned, or human-provided models, and/or criteria of the data or techniques used in training the model.

The association between activity record 220 and output datum record 226 is depicted, conceptually, as part of activity record 220, in embodiments, each datum record 206 can comprise a link or reference to the generating activity record 220. In yet other embodiments, a separate data structure or element (such as a linking table) can store associations between activity record 220 and output datum records 226. Similarly, the association between activity record 220 and any input datum records 228 can be stored as a link or reference within activity record 220 and/or within datum records 206, or in a separate data element entirely.

Timestamp 230 can record the time and date of execution of the activity. Timestamp 230 can include multiple time entries, such as a first timestamp recording the beginning of the activity, and a second timestamp recording the completion of the activity.

Trust modifier 232 can be a value or other data relating to attributions, confidence measures, or other information directly applied or propagated to activity record 220 as described in more detail with respect to FIG. 11 below.

Figure 5:
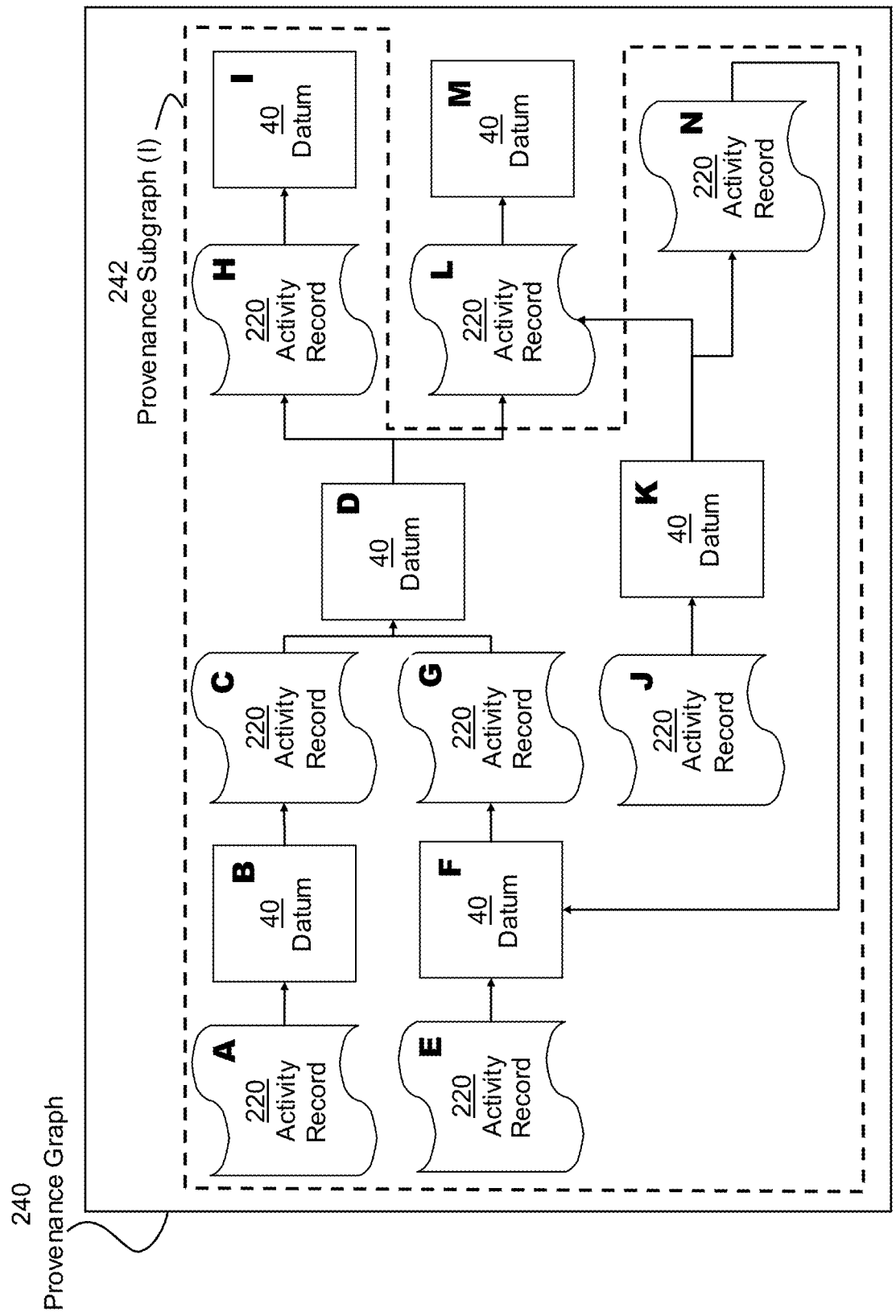
FIG. 5 is a schematic diagram depicting a provenance graph, according to an embodiment.

FIG. 5 is a schematic diagram depicting an example of a provenance graph 240 as can be stored, generated and/or retrieved by embodiments. Provenance graph 240 comprises one or more activity records 220 as associated with one or more datums 40. Each datum 40 can be an associated with an output datum record 226 of activity record 220, or an input datum record 228 of activity record 220. Provenance graph 240, therefore, can be traversed using one or more graph traversal techniques known in the art to determine a set of activities 30 and datums 40 that depend on the operation of a specific activity record 220, or determine one or changes of activity records 220 that resulted in a particular datum 40. In particular, a provenance subgraph 242 can be retrieved for a selected datum 40 by traversing provenance graph 240 from a selected datum 40, through each activity record 220 and input datums 40 that the selected datum 40 depends on. Each provenance subgraph 242, therefore, can comprise a set of lists, chains, arrays, or other directed data structures with each element in the set representing one provenance path.

In embodiments, provenance subgraph 242 can be provided to visualizer user interface 504 for display. In embodiments, provenance subgraph 242 can contain all of the data for each activity record 220 within provenance graph 240, in order to minimize processing resources used for data lookup. In other embodiments, provenance subgraph 242 or can include only pointers or links to data within provenance graph 240 in order to reduce the amount of data transmitted. In yet other embodiments, the amount of data provided with provenance subgraph 242 can be adjusted manually or automatically based on parameters such as the processing speed of visualizer user interface 504, and/or the connection speed between visualizer user interface 504 and other components of system 100.

For example, as depicted in FIG. 5, activity record A generates datum B, which is used as an input to activity record C, which produces datum D. Independently, activity record E generates datum F, which is used as input to activity record G, which also produces datum D. Datum D is used by activity record H produce datum I. Datum D is also used by activity record L (in conjunction with datum K as produced by activity record J) to produce datum M. Datum K is also used by activity record N, which independently produces datum F.

A provenance subgraph 242 for datum I, as may be produced by embodiments includes the following set of provenance paths: {{A,B,C,D,H}, {E,F,G,D,H}, {J,K,N,F,G,D,H}}. Each path of the provenance subgraph is a well-formed origin, or explanation describing the provenance of datum I. As such, the discrete provenance paths for datum I enable reasoning based on the datums and activities from which it depends. For example, each of the provenance paths for determining I involved datum D and activity H. If datum D is determined to be false, or some attribute of activity H (such as the agent, the type of operation performed, or the like) was determined to be less trustworthy, it could be determined that I is less likely to be correct. On the other hand, activity E is less essential to deriving I, as two alternative paths to I exist. Provenance graph 240, enables system 100 to automatically determine and display the implications of confidence or trust attributions as applied to any element in the provenance subgraph 242 for a given datum 40.

Figure 6:
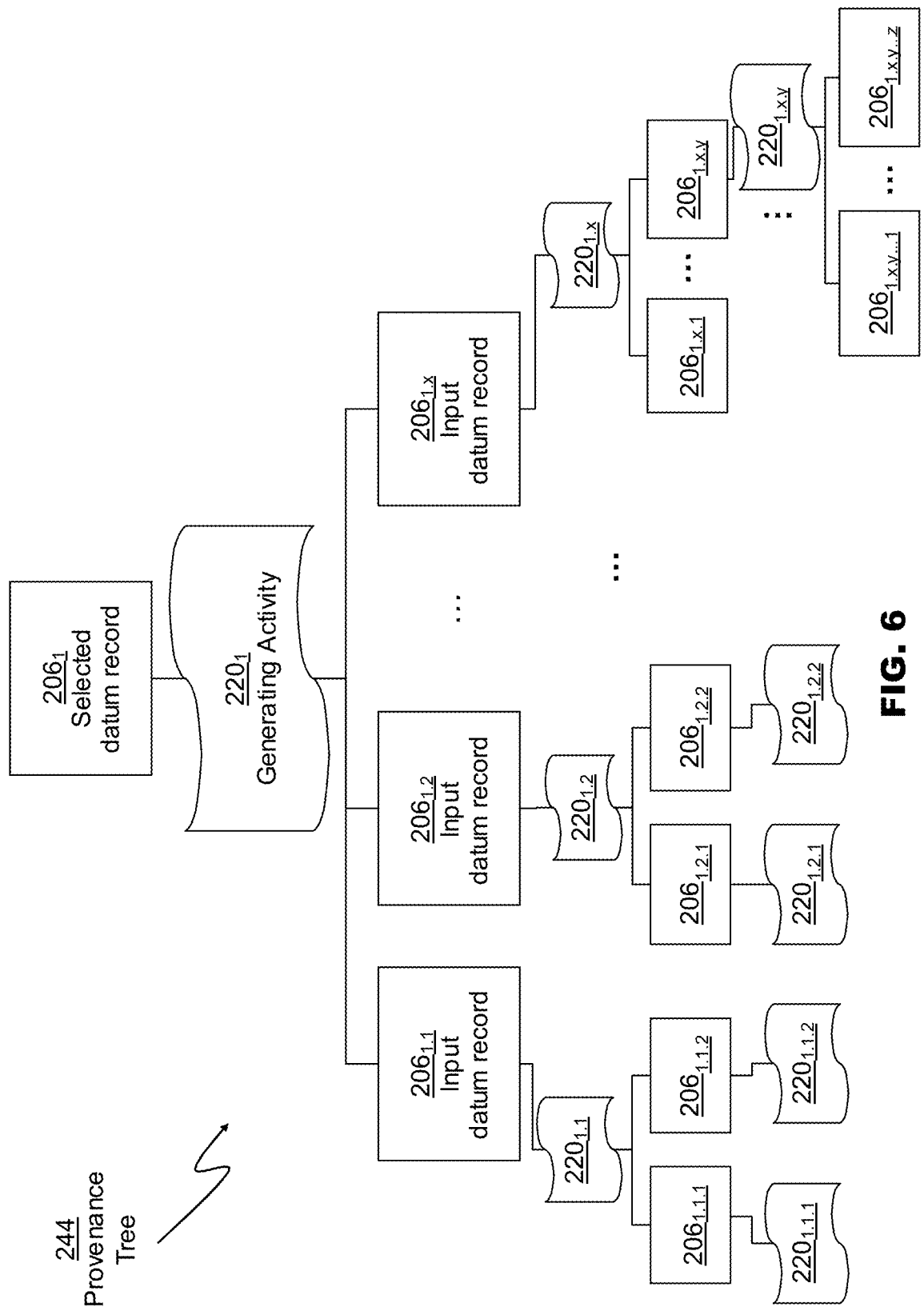
FIG. 6 is a schematic diagram depicting a provenance tree, according to an embodiment.

In certain embodiments, each datum record 206 can be a unique element created by a particular instance of an activity. Each datum 40, therefore, can be associated with multiple datum records 206. As depicted in FIG. 6, provenance relationships for a selected unique datum record 206 can be depicted in the form of a provenance tree 244. In the example provided in FIG. 6, the generating activity $220_1$ of the selected datum record $206_1$ can be found. Generating activity $220_1$ includes multiple input datum records $206_{1.1}$-$206_{1.x}$. Provenance graph 240 and provenance subgraph 242 can therefore be generated by traversing the provenance trees 244 for a selected datum record, and any equivalent datum records. An equivalent datum record 206 can be any datum record 206 including a datum 40 defining the same relationship 42 between the same first entity 44a and second entity 44b. In embodiments, equivalent datum records can be determined by performing a search of knowledge store 202. The provenance subgraph 242 for a selected datum record 206 can therefore comprise a collection of all of the sets of lists of activity records for each selected datum record 206 and its equivalents.

Figure 7:
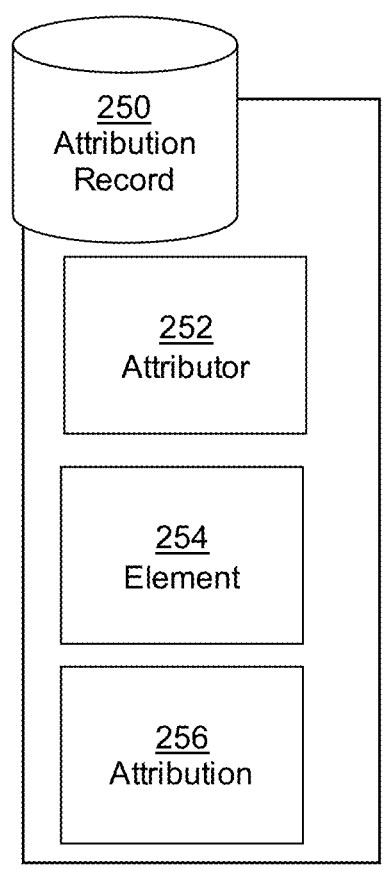
FIG. 7 is a schematic diagram depicting an attribution record, according to an embodiment.

FIG. 7 is a schematic diagram depicting the data structure of an attribution record 250 according to an embodiment. Attribution record 250 can represent or store attribution or confidence values assigned to datums 40, datum records 206, classes of datum, agents 302, classes of agent, classes of operations, or sources of data. Attributor 252 can be a link or value identifying an agent 302 (whether human or software) that provided the attribution. Element 254 can be a link or value identifying the record or class to which the attribution applies. Attribution 256 can comprise a confidence value, such as an integer or decimal value between one and ten, or one and one-hundred, a letter grade (A, B, C, D, F . . . ), a color rating, or any other relative value. In embodiments, attribution 256 can be a value on a standard scale. One such scale is provided in ICD 203 (U.S. Office of the Dir. of Nat'l Intelligence, *Intelligence Community Directive* 203: *Analytic Standards* (Jan. 2, 2015)), though other scales can of course be used. Attribution 256 can further comprise text-based data including explanations, justifications, assumptions, and statements of bias, which can be stored to provide further information to reviewers.

Element 254 can be mapped to one or more attributes of activity record 220. For example, element 254 can refer to a datum 40, and any activity records 220 that have that datum associated as an input datum can be applicable to, or associated with, attribution record 250. Element 254 can be an identifier of an agent or class of agents, such that activities performed by that agent or class of agents are applicable to attribution record 250. Element 254 can be an identifier of a class of operations, and any activities that perform an operation in that class can be applicable to attribution record 250. Element 254 can be an identifier of a data source or class of data source, and any activities that rely on that data source or class of data sources can be applicable to attribution record 250. Element 254, therefore, can comprise a link, pointer, or other data field that can identify on or more attributes, traits, or characteristics of activity records 220 to which attribution record 250 can apply.

Returning now to FIG. 1, agent interface 300 can be an intermediary between agents 302 and other components of system 100, such as data store 200. Agents 302 can be user agents 304 or software agents 306 (software agents 306 can also be referred to as machine agents, or artificial intelligence agents). User agents 304 can comprise user interfaces enabling users of system 100, or users of other systems capable of interfacing with system 100 to provide information to system 100. Software agents 306 can comprise one or more scripts, programs, machine instructions, or other executable code that can receive information to be processed, for example in the form of datum records 206, perform one or more activities to create new datum records 206 as recorded in activity records 220.

Agent interface 300 can present or expose one or more application programming interfaces (APIs) to receive information from, and provide information to system 100. Datums 40 provided by software agents 306 can be stored in knowledge store 202 in datum records 206, and activity records 220 can be generated.

While agent interface 300 is depicted, schematically as separate from software agents 306, it should be understood that agent interface 300 can comprise one or more libraries, scripts, modules, packages, or other resources that can be incorporated into or executed by independent software agents 306, or user-control user agents 304. Agent interface 300 therefore, can comprise a wrapper, or scaffolding, providing an encapsulation layer between the algorithms, methods, and workflows of individual agents 300 and the internal storage structures and protocols of system 100.

In one embodiment, agent interface 300 can be a centralized coordinator such that software agents 306 can register to be invoked based on one or more triggers. For example, software agents 306 can register to be invoked when certain datum records 206 or classes of datum records 206 are added, removed, or updated. Other software agents 306 can register to be invoked on a scheduled basis (for example, agents 306 can be polled once per minute, hour, day, or any other interval). Similarly, agent interface 300 can advertise or publish lists or sets of data or classes of data that has been updated within a set period of time.

In other embodiments, software agents 306 can be invoked, executed, or operated independently of system 100, and connect to agent interface 300 to provide datums 40 without being invoked directly by agent interface 300.

Software agents 306 can also be configured to use top-down automated planning in embodiments. Agents 306 can be configured to find work (such as updated information) and coordinate with (by invoking) one or more additional agents using a scripted workflow. For example, a first agent can be configured to detect updates to a publicly available data source, such as a social media ingestion agent that is configured to monitor for social media content that meets particular criteria (such as, content bearing particular tags, or posted by particular users. When the source is updated, the first agent can co-ordinate the execution of one or more child agents, such as parsers, pattern matchers, and the like, to process any updated data. The first agent can then provide any extracted datums 40 to system 100 via agent interface 300.

Agents 302 can execute in parallel with other components of system 100. For example, each agent 302 can be executed within a separate physical or virtual computing environment with respect to other agents, or system 100. Agents 302 can communicate with other components of system 100 via wired or wireless networks, local or remote procedure calls, shared file system entries, physical ports, or the like. Such parallel processing can provide improvements to the scalability and reliability of system 100, as dependence on individual computing environments can be lessened. Similarly, the reliability of individual agents can be evaluated by comparing the result provided by two or more agents from performing similar data operations using similar data.

In embodiments, the access of data within knowledge store 202 and/or external data sources 402 by agents 300 can be secured to prevent unwarranted dissemination of information. For example, agents 302 may be required to authenticate prior to accessing datum records 206, or even information including the identifiers of datum records 206 that have received updates. Communications between agents 300, components of system 100, and external data sources 402 can be cryptographically secured in embodiments.

FIGS. 8A-8F are schematic views depicting example screens that may be presented by a user agent 304, in embodiments. A user agent 304 can be a software product executing on a computing system with a user interface to display information to and receive information from a user.

For example, user agent 304 can be computer application, a web application, or a mobile application in embodiments. Each of the various screens depicted can be arranged on a display in a single window, separate windows, or other arrangement.

Figure 8B:
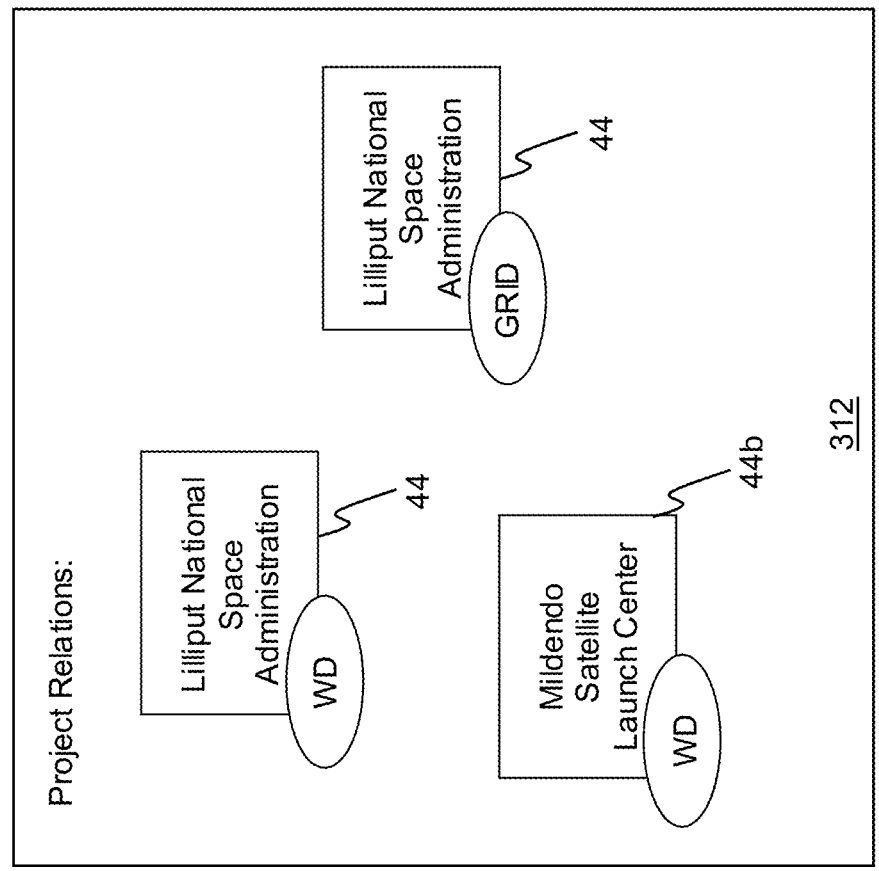
Figure 8A:
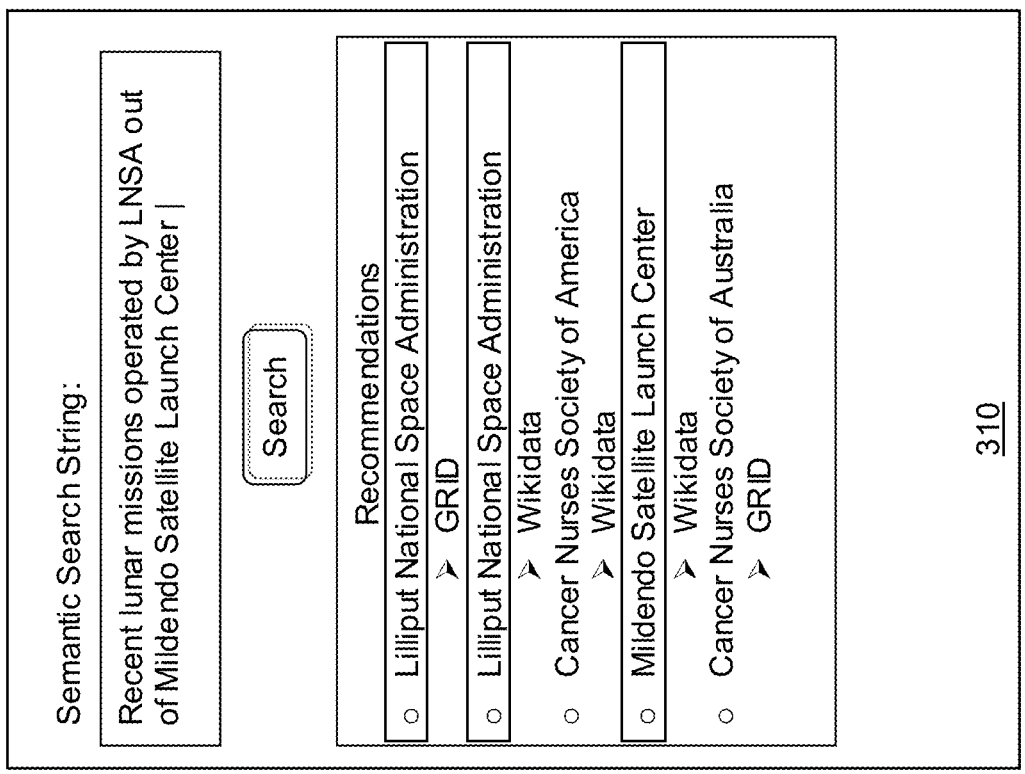

FIG. 8A depicts a search screen 310, enabling a user to enter a search string and, in embodiments, receive the results of a semantic search. As depicted, the user has entered "Recent lunar missions operated by LNSA out of Mildendo Satellite Launch Center," and a number of recommended results are provided. As depicted, three entries have been selected by the user. FIG. 8B depicts a project relations screen 312, according to an embodiment. The three selected entries are depicted as entities 44.

Figure 8C:
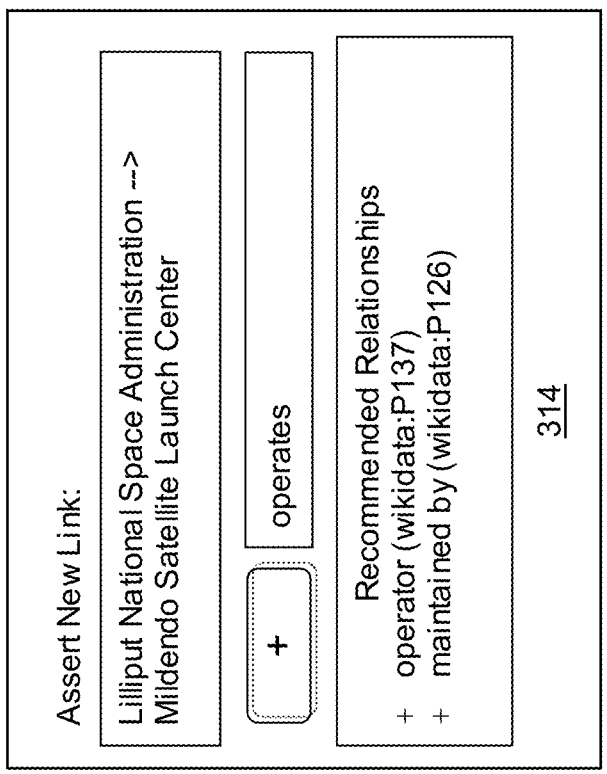
Figure 8D:
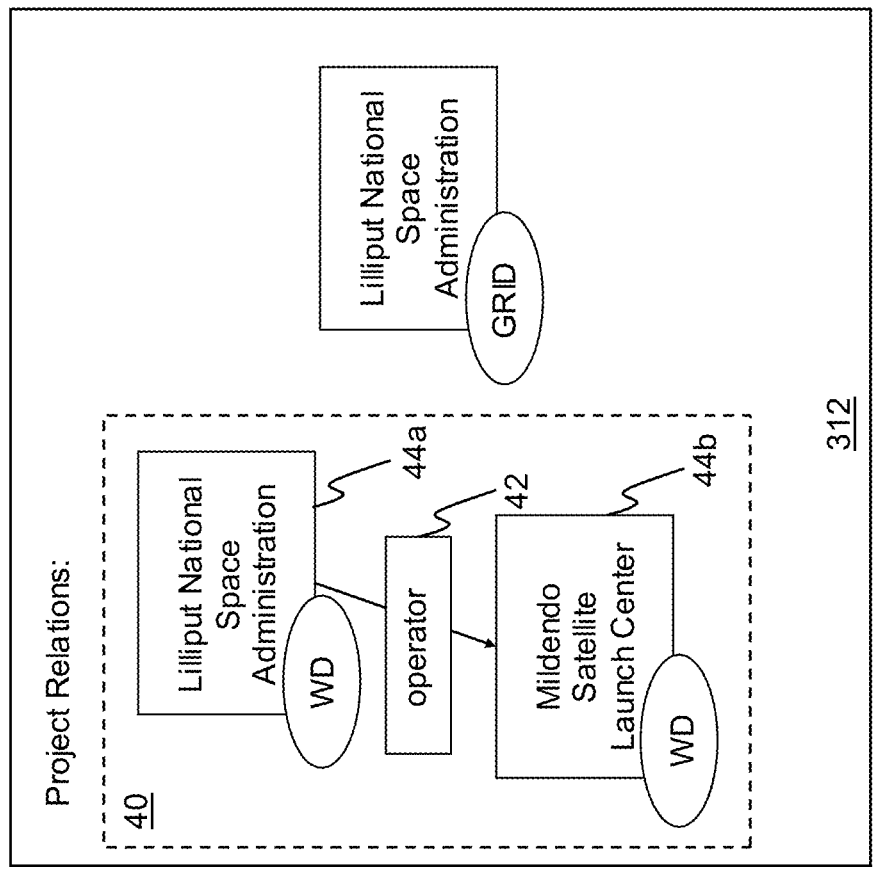

FIG. 8C depicts a new link screen 314, as can be displayed by embodiments in response to a user selection of two or more entities. New link screen 314 can enable the user to directly enter a datum 40 as a link between two entities. As depicted, the user can search for a relationship 42, and recommended relationship types can be generated or discovered based on the user's entry. In embodiments, recommended relationships can comprise properties, links, relationships, or other attributes defined in one or more structured data models, such as the WIKIDATA data model. FIG. 6D depicts the project relations screen 312 updated to indicate the user provided datum 40: <Lilliput National Space Administration, operator, Mildendo Satellite Launch Center>. This datum 40 can be stored by system 100 in a datum record 206 and an activity record 220 can be generated. The activity record can comprise an agent identifier 222 identifying the user, if user identification information (such as user name) is available, as well as information that can be used to identify the computing system hardware and software that was used. For example, the user agent can be identified by software version, web browser (for web-based clients), internet protocol address, hardware configuration, or any other available information regarding the user agent 304.

FIG. 8E is a merge entities screen 316, as can be displayed by embodiments in response to a user selection of two or more entities. Merge entities screen 316 can enable the user to create a handle datum to link two external data entries into a single entity 44. FIG. 8F depicts the project relations screen 312 updated to depict the link between the WIKI-DATA and GRID source of the "Lilliput National Space Administration" entity. As such, information received from either data source regarding the entity can be reflected based on the single merged entity.

Figure 9:
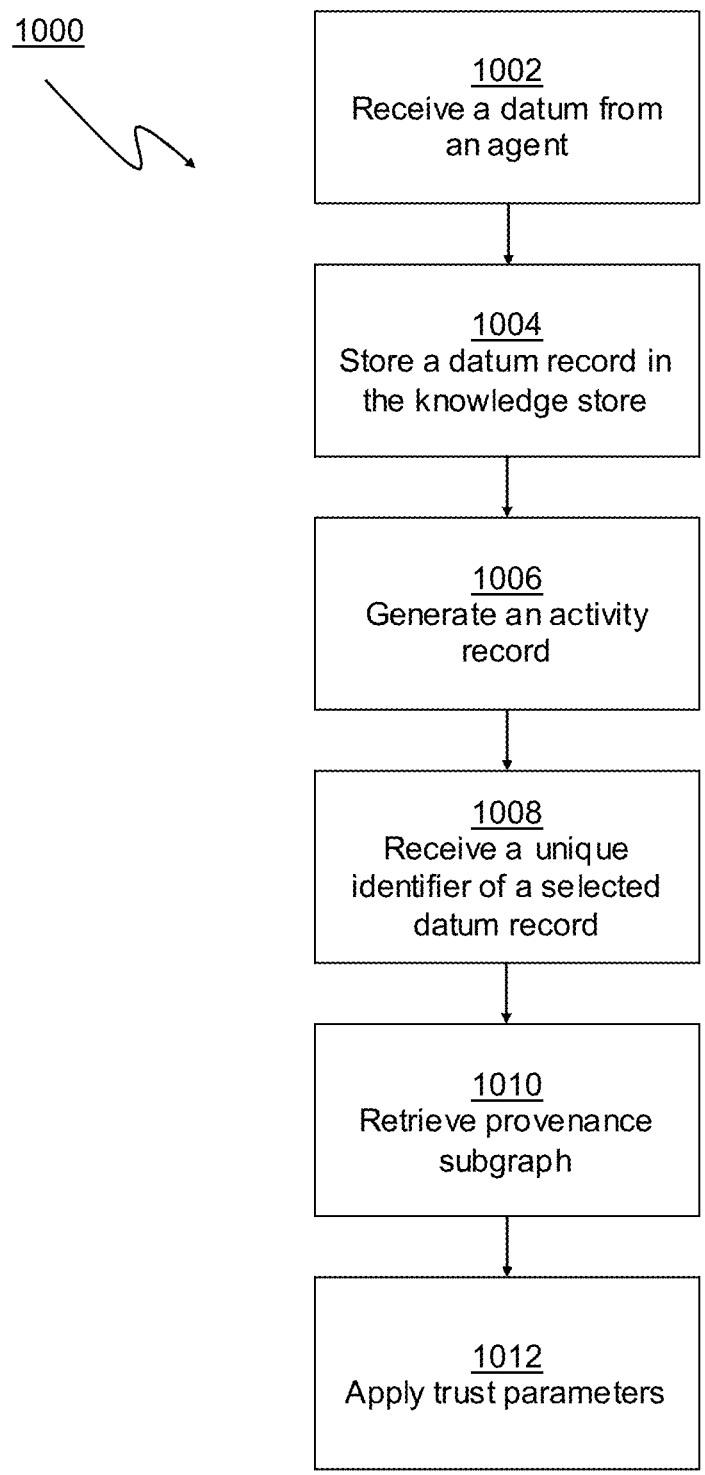
FIG. 9 is a flowchart depicting a method for retrieving a displaying the provenance of a datum, according to an embodiment.

FIG. 9 is a flowchart depicting a method 1000 for determining the provenance of any datum 40 stored in data store 200. At 1002, a datum can be received via agent interface 300 from an agent 302. At 1004, a datum record 206 can be generated and stored in knowledge store 202. In embodiments, knowledge store 202 can be searched to determine if an equivalent datum record 206 already exists, before creation of a new datum record 206. If a new datum record 206 is created, it can be linked, combined with, or otherwise associated with any preexisting datum records 206.

At 1006, an activity record 220 can be generated and stored as a link in provenance graph 240 within provenance store 204.

It should be recognized that 1002, 1004, and 1006 can be repeated multiple times as data is received from agents 302 prior to receiving a request for provenance of a selected datum record 206 at 1008. At 1010, the provenance subgraph 242 for the selected datum record 206 can be retrieved or generated, in further detail with respect to FIGS. 10 and 11 below.

At 1012, the provenance subgraph 242 can be augmented by applying any provided trust parameters. The provenance subgraph 242 can be provided for display via visualizer user interface 504.

Figure 10:
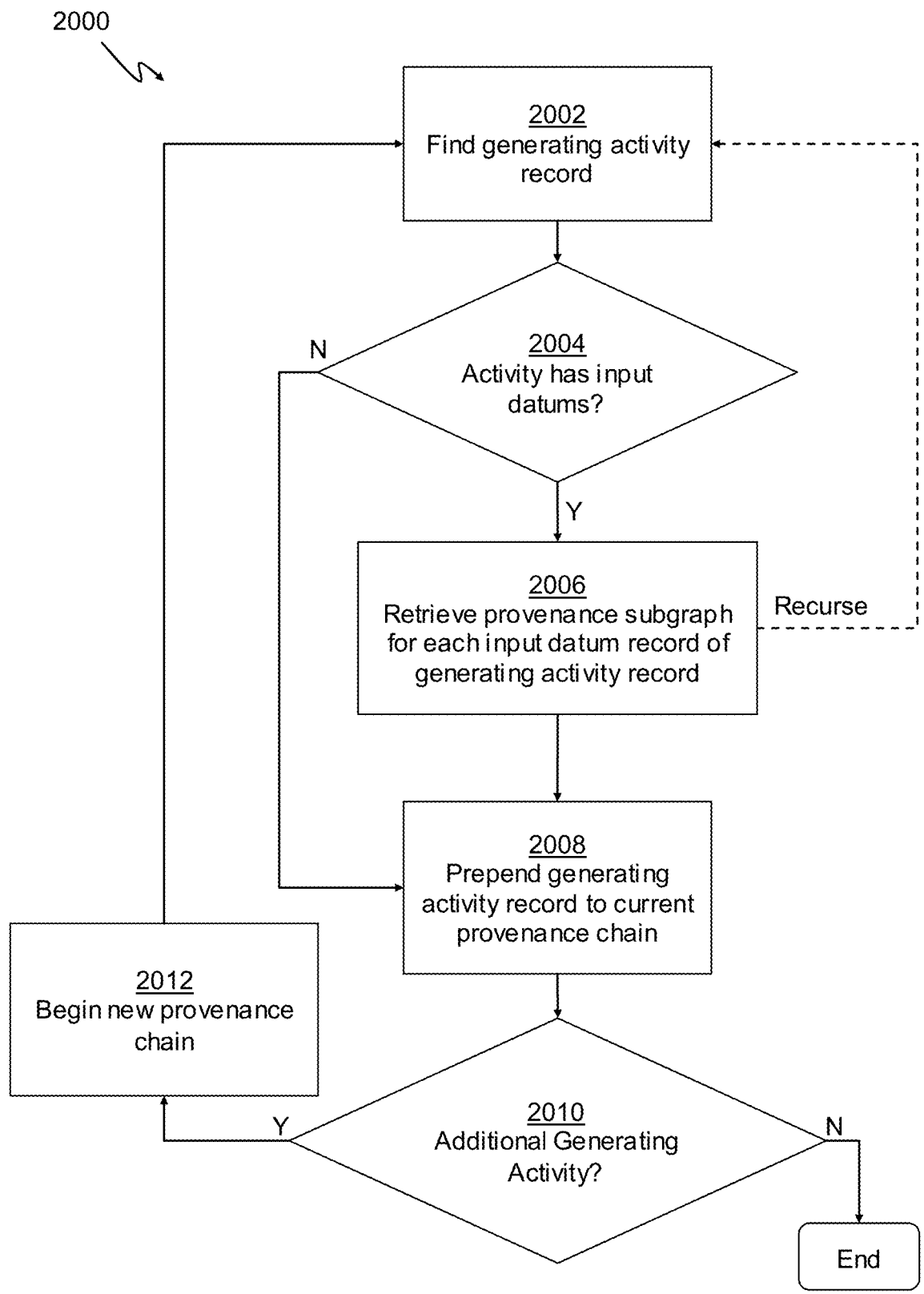
FIG. 10 is a flowchart depicting a method for retrieving a provenance subgraph, according to an embodiment.

FIG. 10 is a flowchart depicting a method 2000 for retrieving a provenance subgraph 242 for a selected datum 40 per 1010 as discussed with respect to FIG. 9 above, according to an embodiment. As discussed above with respect to FIG. 5, provenance subgraph 242 can be a set of provenance chains retrieved by traversal of a provenance graph 240. At 2002, a generating activity record of the selected datum 40 can be found. If, at 2004, the generating activity record has no input datum records, the current activity record is a leaf node, and can be prepended to the current provenance chains at 2008. If, at 2004, the generating activity record has input record, at 2006 the provenance subgraph 242 of each of the input datum records can be recursively generated and added to the retrieved provenance subgraph 242.

If, at 2010, additional generating activities of the selected datum 40 are discovered, a new provenance chain can be started at 2012, and processing can be iterated by beginning again at 2002. Otherwise, processing can end and the retrieved provenance subgraph can be returned.

Figure 11:
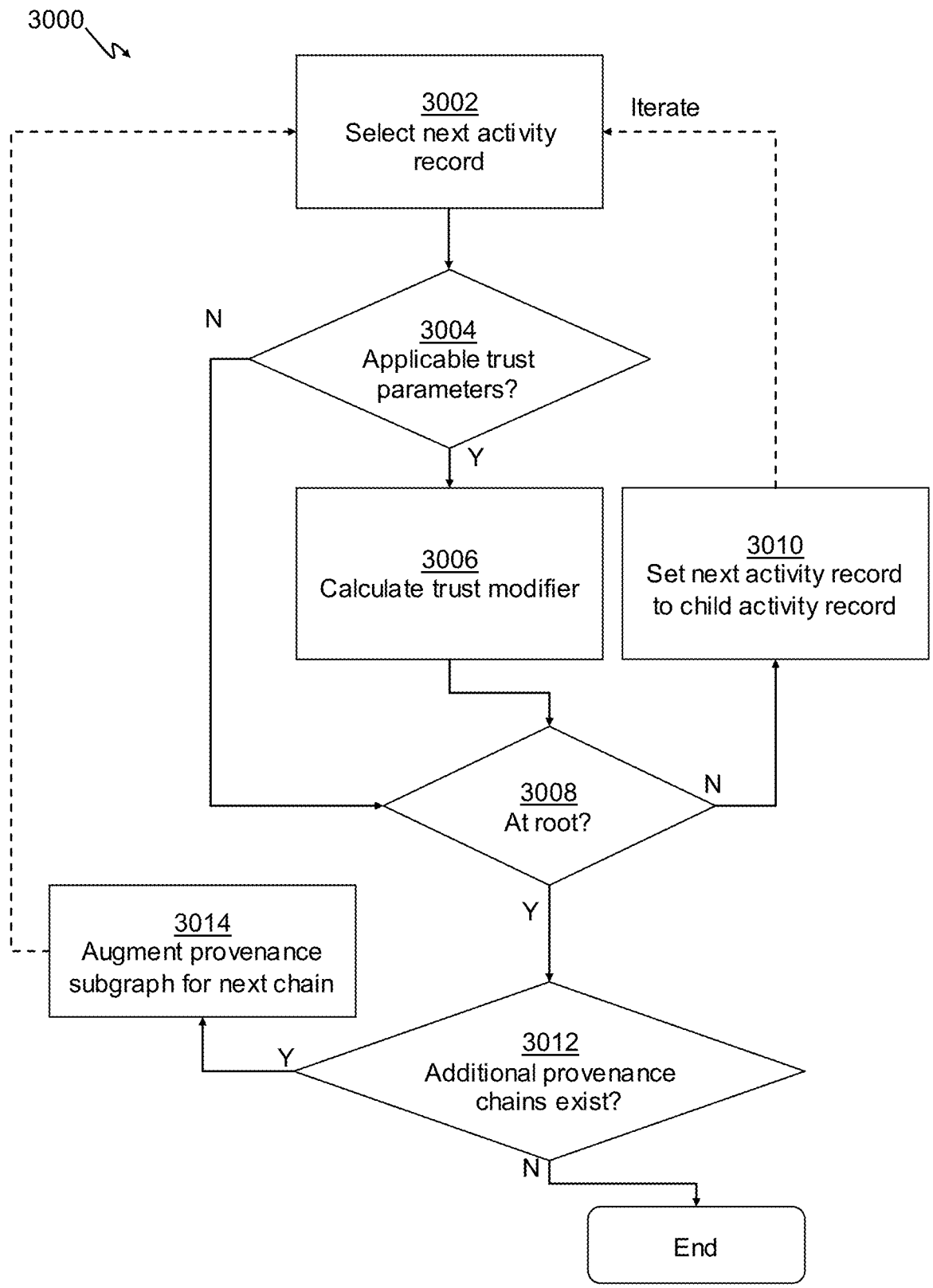
FIG. 11 is a flowchart depicting a method for augmenting a provenance subgraph, according to an embodiment.

FIG. 11 is a flowchart depicting a method 3000 for applying one or more trust parameters to a provenance subgraph 242 per 1012 as discussed with respect to FIG. 8 above. Each activity record 220 of provenance subgraph 242 can be augmented with a trust modifier 232. Trust modifier 232 can be calculated based on trust parameters received via attribution records 250, on-demand refutations, and/or trust modifiers 232 applied to any parent activity records in provenance subgraph 242. Method 3000 can comprise an iterative traversal of each provenance chain of provenance subgraph 242.

At 3002, an activity record can be selected. In embodiments, the selected activity record can be the first activity record in a chain of provenance subgraph 242. At 3004, applicable trust parameters can be determined. An applicable trust parameter can be an attribution record 250 providing an attribution 256 including a confidence in the source, class, or value of any of the input datum records of activity record 220. An applicable trust parameter can further be a temporary refutation of the agent, class of agent, operation, or class of operation, or the source of input datum record as could be received via visualizer user interface 504. Like attributions 256, temporary refutations can be total falsifications (such as a confidence value of zero), or partial falsifications (such as a confidence value of greater than zero).

At 3006, the trust modifier 232 of the activity record 220 can be calculated. Various mathematical methods can be used to calculate trust modifier 232. For example, a default trust modifier 232 can be 1, and the trust modifier 232 can be modified by multiplying the current trust modifier by confidence values from attribution records 250 and/or temporary refutations, which can each have, or be assigned, a value between 0 and 1. The calculated trust modifier 232 can be propagated to follow-on provenance records by being temporarily stored as a trust parameter, or by accessing the trust modifier 232 applied to a parent activity record when evaluating a child activity record.

At 3008, if the current activity record 220 is not at the root of a chain in provenance subgraph 242 (i.e., additional child activities remain), the next activity record 220 can be set to the next (child) activity record in the chain at 3010

If no additional activity records 220 remain in the current chain, the presence of additional chains can be determined at 3012. If additional chains exist, the provenance graph subgraph 242 for the next chain can be generated at 3014 by execution of method 3000 for the next chain. If no additional chains exist, execution can end.

Referring now to FIGS. 12-17, example provenance visualization screens 506, as might be displayed by embodiments of provenance visualizer user interface 504 are depicted. In embodiments, provenance subgraph retrieve 502 can generate or retrieve provenance subgraph 242 for a datum 40. The retrieved graph or subgraph can be received by provenance visualizer user interface 504 for display. In embodiments, as additional activities are performed by agents 302, updates to the relevant provenance subgraph 242 can be automatically provided to visualizer user interface 504. For example, if an additional inference activity, based on a different datum or set of datums results in datum 40, provenance subgraph 242 can be updated to include the updated provenance chain and provenance visualization screen 504 can be updated automatically.

In the example screens proved, Agents 302 are depicted by empty right-facing triangle symbols, external data sources 402 are depicted by empty circles, datum records 206 are depicted by empty rectangles. Activities are depicted by dot-filled right-facing triangles, handles are depicted by upward facing arrows, qualifiers are depicted by division signs, conflicts are depicted by not-equal signs, links are depicted by solid rectangles, and beliefs are depicted by downward pointing flags. Similar symbols are depicted in other example visualization screens depicted herein. The various embodiments of the present disclosure can use the same, similar, or alternate sets of icons, symbols, colors, animations, movements, sounds, or other ways to depict and differentiate the various data record types depicted.

Figure 12:
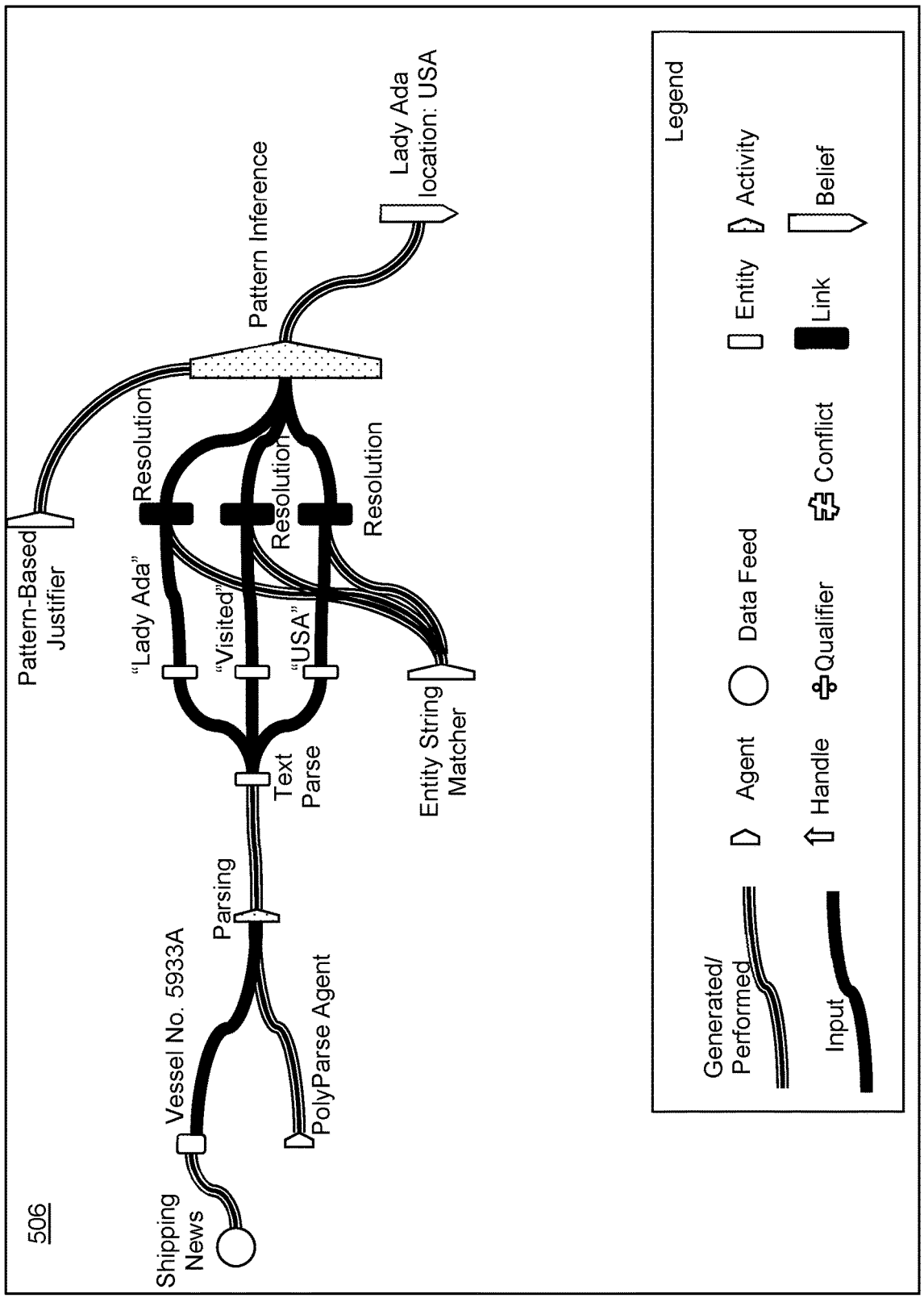
FIGS. 12-17 are mockups depicting example screens of a visualizer user interface, according to an embodiment.

In the example screen depicted in FIG. 12, the provenance of a belief that a vessel known as the Lady Ada is currently located in the United States is shown. Reading from right to left, a pattern inference activity was performed by a pattern-based justifier agent to generate the belief. The activity used three resolved strings, "Lady Ada," "visited," and "USA" to generate the belief. Each of the resolved strings was generated by an entity string matcher agent, based on strings generated by a parsing activity performed by a polyparse agent, that processed a document titled "Vessel No. 5933A" published by a "Shipping News" external data source. In the depicted example, the entity string matcher agent may have been previously configured to identify strings that might apply to entities of interest.

Figure 13:
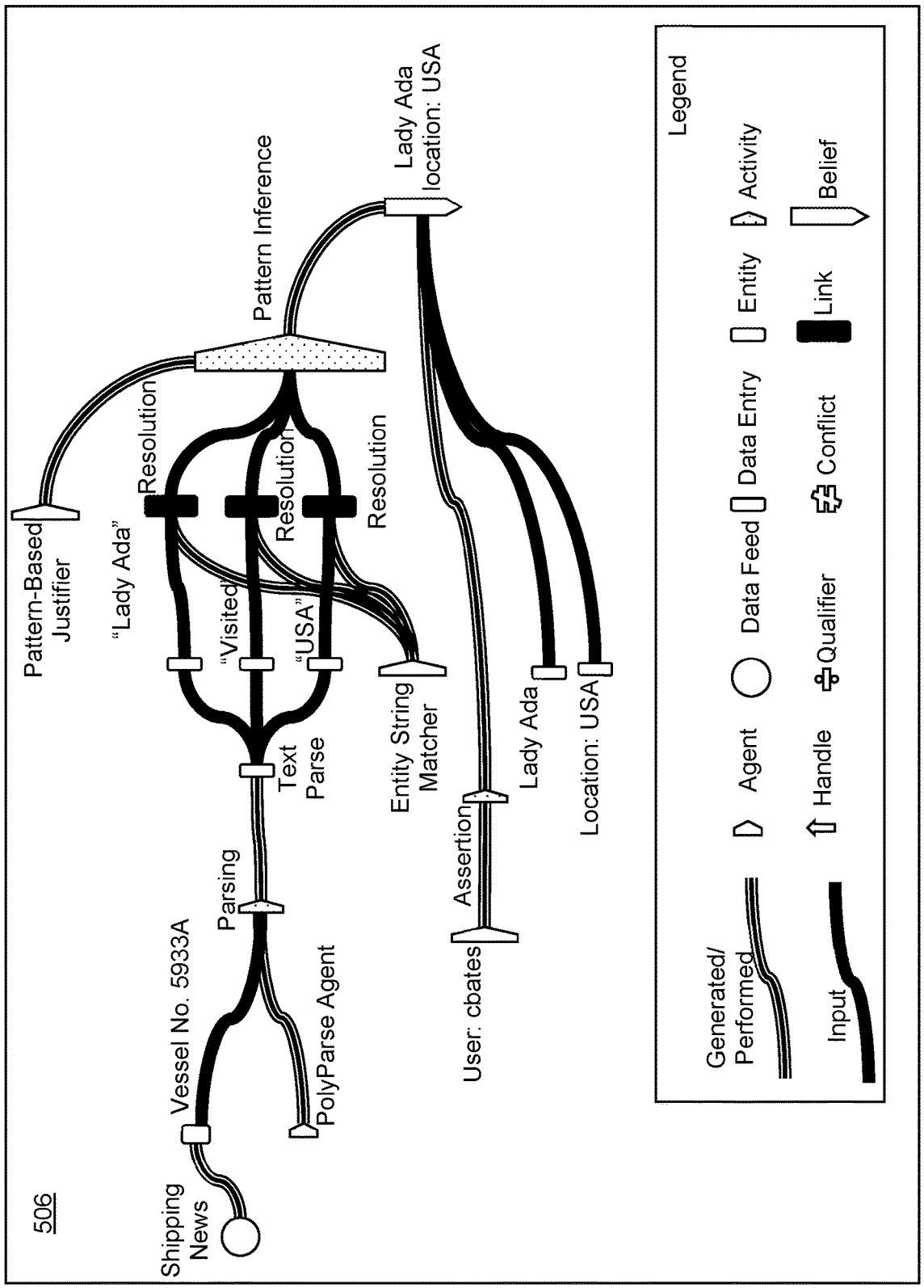

FIG. 13 is an alternate provenance visualization screen 506, in which a second path of datum records provides support for the belief that the Lady Ada is in the United States. Here, a user agent 304, with an identifier of "cbates" has made an assertion that the Lady Ada is in the United States. This assertion aligns with the belief generated by the software agents.

Figure 14:
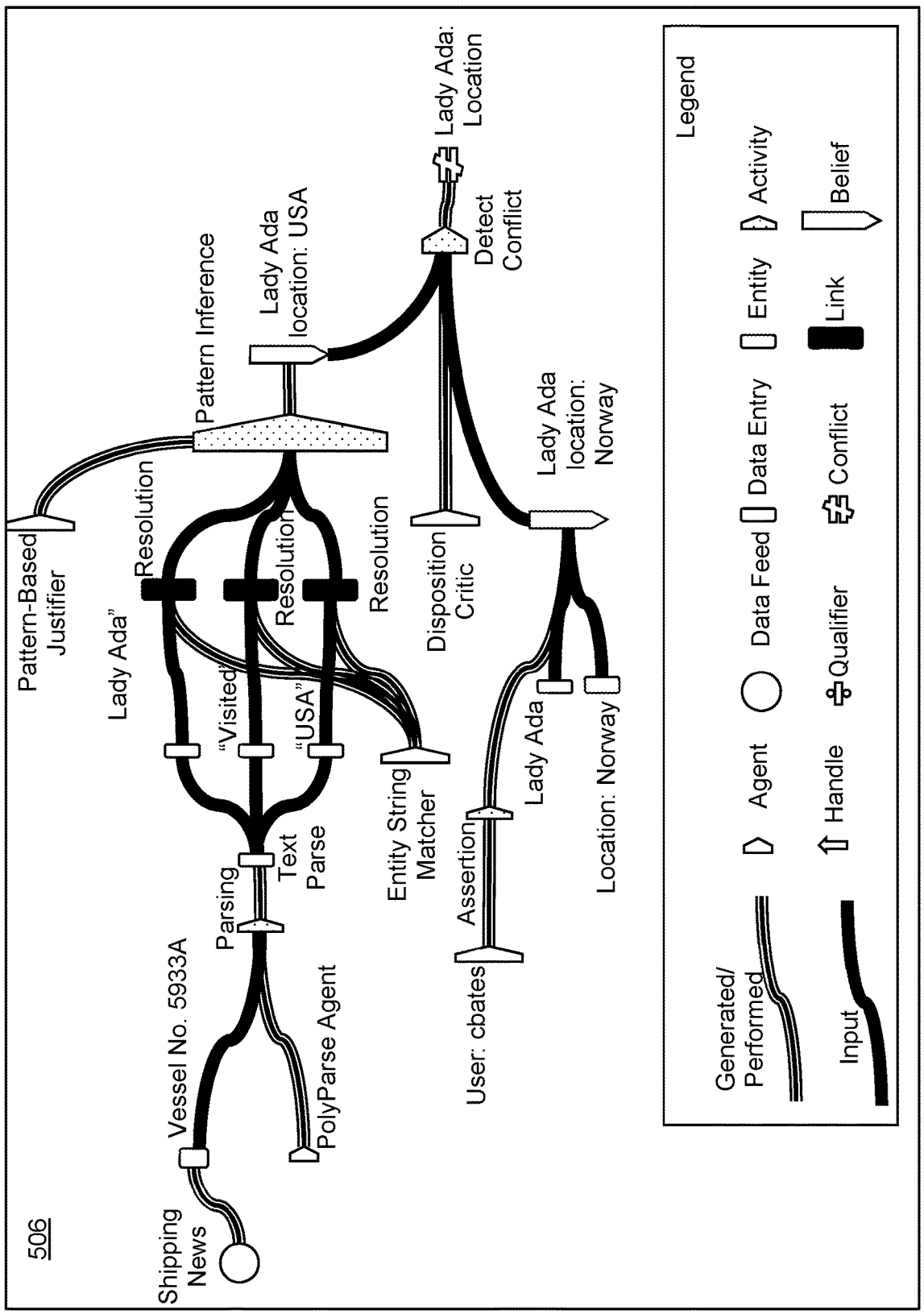

FIG. 14 is an alternate provenance visualization screen 506, in which user cbates has made an assertion that the Lady Ada is in Norway. A disposition critic agent is depicted as performing a detect conflict operation to create a conflict datum based on the location of the Lady Ada. Various techniques of resolving the conflict that are enabled by system 100 are depicted in FIGS. 15-17.

Figure 15:
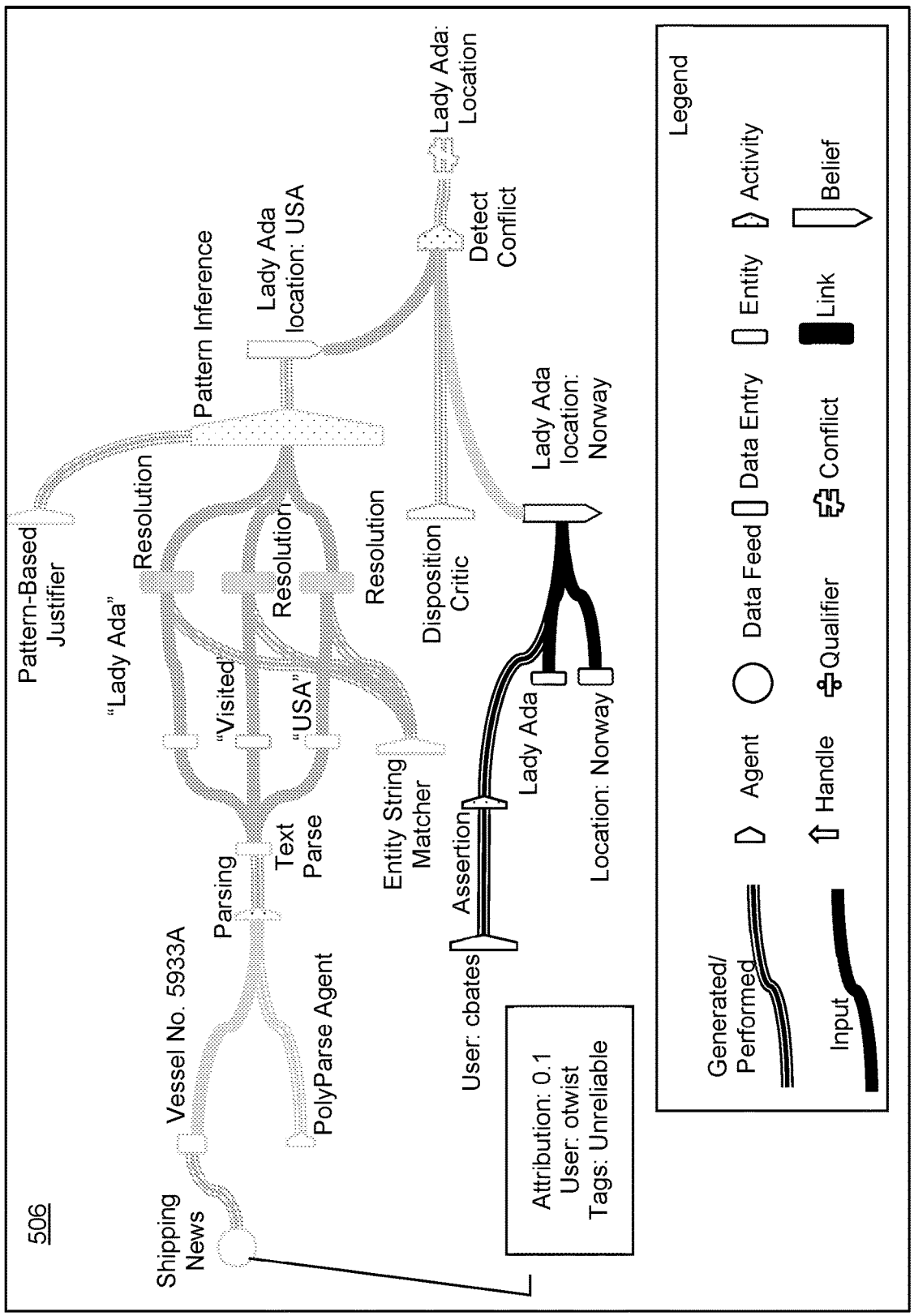

In FIG. 15, a user with ID "otwist" has created an attribution record associated with the Shipping News external data source. The screen is updated to show that not only is the Shipping News considered unreliable (with an attribution 256 including a ICD-203 numerical confidence of 0.1), but the belief generated by it (and the conflict with the other belief) are also shown in grey to indicate the reduced level of trust in the Lady Ada location: USA belief.

Figure 16:
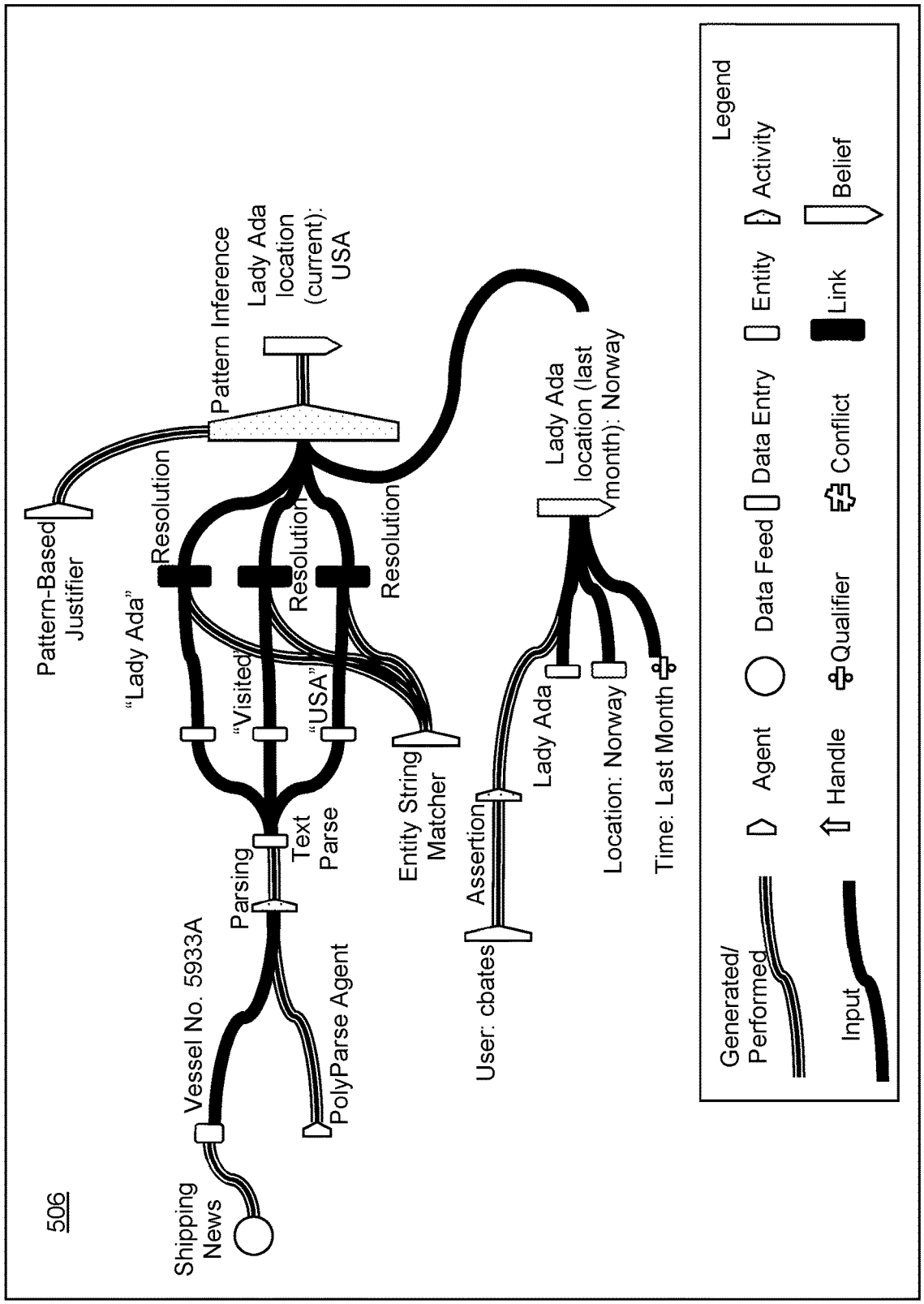

In FIG. 16, the user "cbates" has qualified the assertion first shown in FIG. 15, to indicate that the Lady Ada was seen in Norway "last month." This time-based qualifier enables the pattern-based justifier to provide generate a qualified datum: the Lady Ada is currently in the USA.

Figure 17:
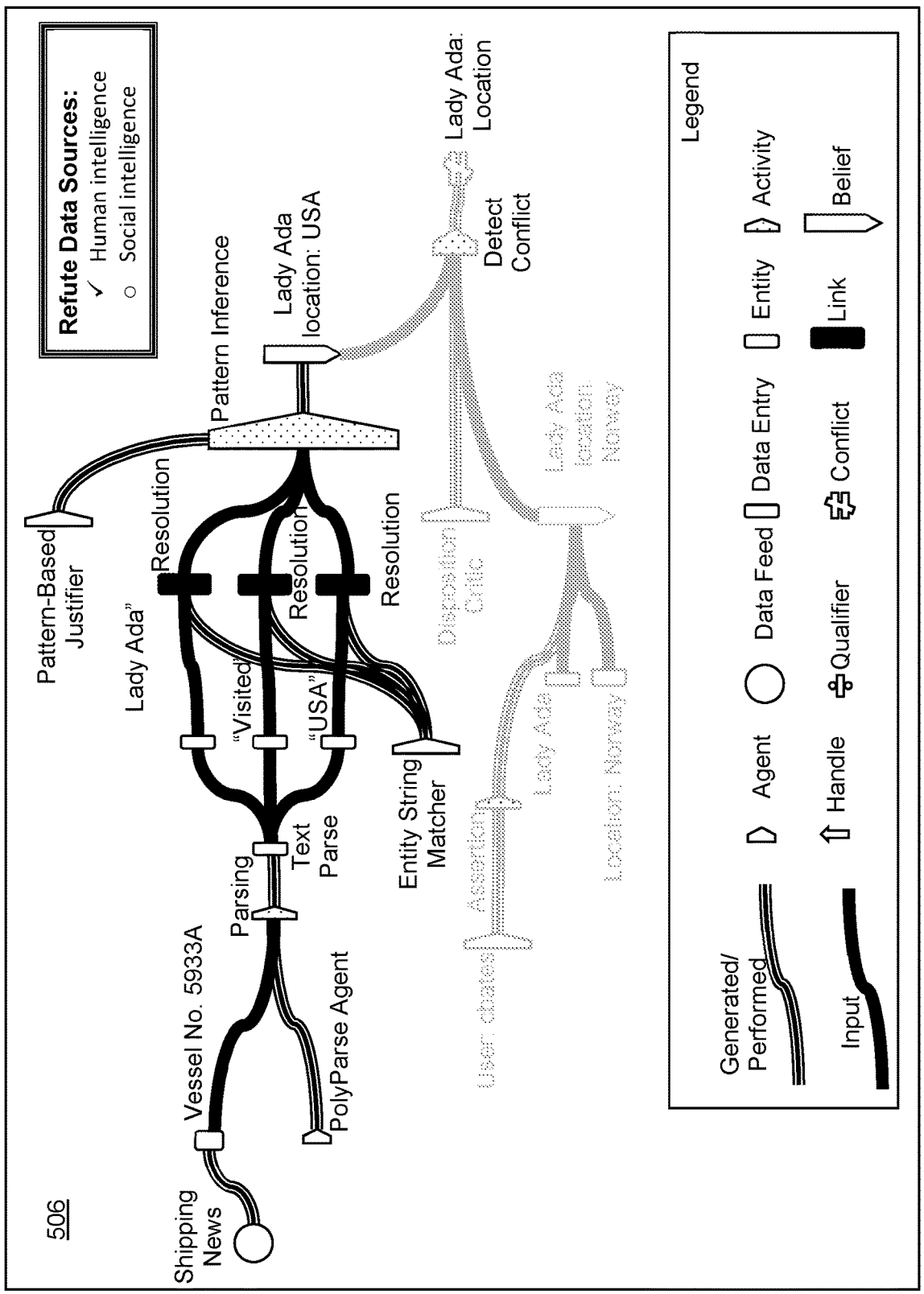

In FIG. 17, the class of human intelligence data sources (including user agents 304) has been temporarily refuted by the user. Provenance visualization screen 506 is updated to indicate that no conflict currently exists. System 100 can support temporary refutations and attribution records including total falsifications (for example, an assumption that all datums provided by "parsing" operations are incorrect), or partial falsifications (for example providing a confidence value of 0.5 for all datums provided by agents using neural networks, or using models trained based on a specific input dataset).

Embodiments of the present disclosure provide a number of technical improvements over conventional systems and methods. While the improvements will be apparent to those of skill in the art in view of the various embodiments described, a selection of such improvements is discussed herein.

Embodiments enable information processing by a plurality of agents in parallel to execute workflows both in synchronous and asynchronous manners. The systems and methods of the present disclosure can therefore be scaled through the provision of additional computing resources for the execution of agents, independently of the hardware and software implementation of other components of system 100. The information stored within data store 200 can also be updated as agents execute, enabling updated information to be displayed to the user as it is received.

Embodiments further provide efficient provenance analysis by storing the provenance information (through linked activity records) as datums are generated or retrieved. The provenance tracking is therefore distributed, and can be updated in real-time or near real-time. Storing the provenance graph and/or provenance tree as provided by embodiments reduces the need for post-processing to recreate the provenance of a datum or other item of information.

The provenance graph structure enables efficient attribute propagation. The information sources, software operations, and data types used for each activity can be propagated downstream through the provenance graph. This can enable embodiments to quickly summarize attributes of the agents and information sources relied on during the generation of an insight or belief. This can enable users to quickly assess the diversity of evidence supporting a piece of information.

Efficient attribute propagation also enables efficient updates to the visualized provenance in response to temporary refutations of information, activities, agents, sources, or classes thereof, from the analysis and assess the effect on downstream conclusions. This can enable users to quickly assess sensitivity of a piece of information to individual elements, or classes of elements.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A provenance analysis system comprising:
a knowledge store comprising a plurality of datum records, each datum record comprising a datum, the datum comprising an indicator of a relationship between a first entity and a second entity;
an agent interface configured to:
receive a datum from an agent;
store an activity record in a provenance graph, the activity record comprising an association with the received datum and any input datums used by the agent to generate the received datum;
a provenance subgraph retriever configured to:
receive a selected datum, and
retrieve a provenance subgraph for the selected datum by recursively identifying each activity record in the provenance graph associated with the selected datum and each activity record in the provenance subgraph of any input datum of an activity record associated with the selected datum;
a confidence propagator configured to:
receive a trust parameter comprising at least one activity attribute, and
apply the trust parameter to the provenance subgraph by augmenting at least one applicable activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node; and
a provenance visualizer comprising a display and a user input interface for receiving a selection of a datum, the provenance visualizer configured to display the retrieved provenance subgraph, wherein, upon logical falsification of the part of the provenance subgraph, the part of the provenance subgraph is visually indicated within the displayed retrieved provenance subgraph, wherein at least one activity record in the provenance graph is supported by received datums from multiple agents, wherein at least one datum record from the knowledge store is supported by multiple activity records, wherein data associated with the at least one datum record is received via an agent interface from an agent, wherein each activity record of the multiple activity records identifies the agent associated with an activity of the activity record and the at least one datum record that the activity record supports.

2. The system of claim 1, wherein the agent interface is further configured to:
search the knowledge store to determine if a datum record comprising the received datum exists, and in response to determining that a datum record comprising the received datum does not exist, storing a datum record comprising the received datum in the knowledge store.

3. The system of claim 1, wherein an activity record of the provenance subgraph is an applicable activity record if the activity record has an activity attribute that matches an activity attribute of the trust parameter or if the activity record has an input datum that is associated with an applicable activity record.

4. The system of claim 1 further comprising a conflict detector, the conflict detector configured to indicate one or more conflicting datums in the provenance graph.

5. The system of claim 1, wherein the part of the provenance subgraph is logically falsified using the trust parameter.

6. The system of claim 1, wherein the activity record comprises an agent identifier, wherein the agent identifier identifies a user, a computing hardware or a software used to create the activity record.

7. The system of claim 1, further comprising an entity-merging engine configured to:
link two external data entries into a single entity; and
adjust the provenance subgraph based on the single entity.

8. The system of claim 1, further comprising a centralized coordinator configured to:
trigger the agent in response to certain datum records or classes of datum records being added, removed or updated.

9. The system of claim 3, wherein augmenting each applicable activity record of the provenance subgraph with a trust modifier based on the trust parameter comprises:
for each activity record found in a search of the provenance subgraph for any activity records having an activity attribute that matches an activity attribute of the trust parameter:
calculating a trust modifier value based on the trust parameter and any existing trust modifier value associated with the activity record;
and iteratively applying the trust modifier value to each child activity record having an input datum that is associated with the activity record.

10. The system of claim 9, wherein the trust parameter comprises a confidence value and calculating a trust modifier value based on the trust parameter and any existing trust modifier value associated with the activity record comprises:
associating a trust modifier value of 1 with the activity record if no existing trust modifier value is associated with the activity record; and
multiplying the trust modifier value by each trust modifier value associated with the activity record.

11. The system of claim 3, wherein the user input interface is further configured to receive the trust parameter, and the provenance visualizer is configured to alter the display of the provenance subgraph based on the trust modifier of each activity record.

12. The system of claim 3, wherein the trust parameter indicates a confidence in a datum.

13. The system of claim 3, wherein each activity record further comprises an identifier of the agent and the trust parameter comprises a value indicating a confidence in activities performed by an agent.

14. The system of claim 3, wherein each activity record further comprises a class of the agent and the trust parameter comprises a value indicating a confidence in activities performed by a class of agents.

15. The system of claim 3, wherein each activity record further comprises a class of operation performed by the agent and the trust parameter comprises a value indicating a confidence in a class of operations.

16. The system of claim 3, wherein each activity record further comprises a source of any input datum associated with an activity, and the trust parameter comprises a value indicating a confidence in a source.

17. The system of claim 4, wherein the logical falsification of the part of the provenance graph falsifies at least one of the one or more conflicting datums.

18. The system of claim 5, wherein the part of the provenance sub graph being logically falsified comprises propagation of falsification-related information across the part of the provenance subgraph.

19. The system of claim 18, wherein the falsification-related information comprises activity records or contributing agents.

20. The system of claim 18, wherein the part of the provenance subgraph being logically falsified causes the provenance visualizer to display the provenance subgraph with nodes in the part of the provenance subgraph shown in a specified color or opacity.

21. The system of claim 18, wherein the part of the provenance subgraph being logically falsified comprises simultaneous recording of falsification of an entire class of agents, activities, or data.

22. The system of claim 21, wherein the part of the provenance subgraph being logically falsified comprises logically falsifying any element dependent on a member of a class of elements that has been falsified.

23. A method for visualizing the provenance of a datum record in a knowledge store, the method comprising:
providing a knowledge store for storage of a plurality of datum records, each datum record comprising a unique datum, the datum comprising an indicator of a relationship between a first entity and a second entity;
receiving a datum from an agent;
storing an activity record in a provenance graph, the activity record comprising an association with the received datum and any input datums used by the agent to generate the received datum;
receiving an identifier of a selected datum;
retrieving a provenance subgraph for the selected datum by recursively identifying each activity record in the provenance graph associated with the selected datum and each activity record in the provenance graph of any input datum of an activity record associated with the selected datum;
receiving a trust parameter comprising at least one activity attribute;
applying the trust parameter to the provenance subgraph by augmenting each applicable activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node; and
displaying the retrieved provenance subgraph, by a provenance visualizer comprising a display and a user input interface for receiving a selection of a datum record, wherein, upon logical falsification of the part of the provenance subgraph, the part of the provenance subgraph is visually indicated within the displayed retrieved provenance subgraph, wherein at least one activity record in the provenance graph is supported by received datums from multiple agents, wherein at least one datum record from the knowledge store is supported by multiple activity records, wherein data associated with the at least one datum record is received via an agent interface from an agent, wherein each activity record of the multiple activity records identifies the agent associated with an activity of the activity record and the at least one datum record that the activity record supports.

24. The method of claim 23, further comprising searching the knowledge store to determine if a datum record comprising the received datum exists, and in response to determining that a datum record comprising the received datum does not exist, storing a datum record comprising the received datum in the knowledge store.

25. The method of claim 23, wherein an activity record of the provenance subgraph is an applicable activity record if the activity record has an activity attribute that matches an activity attribute of the trust parameter or if the activity record has an input datum that is associated with an applicable activity record.

26. The method of claim 23, further comprising a detecting one or more conflicting datum records, and altering the display to indicate the one or more conflicting datum records.

27. The method of claim 25, wherein augmenting each applicable activity record of the provenance subgraph with a trust modifier based on the trust parameter comprises:
for each activity record found in a search of the provenance subgraph for any activity records having an activity attribute that matches an activity attribute of the trust parameter:
calculating a trust modifier value based on the trust parameter and any existing trust modifier value associated with the activity record;
and iteratively applying the trust modifier to each child activity record having an input datum that is associated with the activity record.

28. The method of claim 25, wherein the trust parameter comprises a confidence value and calculating a trust modifier value based on the trust parameter and any existing trust modifier value associated with the activity record comprises:
associating a trust modifier value of 1 with the activity record if no existing trust modifier value is associated with the activity record; and
multiplying the confidence value by each trust modifier value associated with the activity record.

29. The method of claim 25, wherein the trust parameter is received via the user input interface and further comprising altering the display of the provenance subgraph based on the trust modifier of each activity record.

30. The method of claim 25, wherein the trust parameter indicates a confidence in a datum.

31. The method of claim 25, wherein each activity record further comprises an identifier of the agent and the trust parameter comprises a value indicating a confidence in activities performed by an agent.

32. The method of claim 25, wherein each activity record further comprises a class of the agent and the trust parameter comprises a value indicating a confidence in activities performed by a class of agents.

33. The method of claim 25, wherein each activity record further comprises a class of operation performed by the agent and the trust parameter comprises a value indicating a confidence in a class of operations.

34. The method of claim 25, wherein each activity record further comprises a source of any input datum, and the trust parameter comprises a value indicating a confidence in a source.

35. A method for modeling and visualizing the provenance of data used and produced by an analytic assessment, the method comprising:
providing a knowledge store for storage of a plurality of datum records, each datum record comprising a unique datum, each unique datum representing an item of information;
receiving a datum from an agent;

storing an activity record comprising an association with the received datum and any input datums used by the agent to generate the received datum;

receiving an identifier of a selected datum and a trust parameter, the trust parameter comprising at least one activity attribute;

retrieving a provenance subgraph for the selected datum by recursively identifying each stored activity record associated with the selected datum and each stored activity record in the provenance subgraph of any input datum of an activity record associated with the selected datum;

applying the trust parameter to the provenance subgraph by augmenting each applicable activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node; and displaying the retrieved provenance subgraph by a provenance visualizer comprising a display and a user input interface for receiving a selection of a datum, such that each activity record of the provenance subgraph is visually distinguished based on the applied trust modifier of the activity record, wherein, upon logical falsification of the part of the provenance subgraph, the part of the provenance subgraph is visually indicated within the displayed retrieved provenance subgraph, wherein at least one activity record in the provenance graph is supported by received datums from multiple agents, wherein at least one datum record from the knowledge store is supported by multiple activity records, wherein data associated with the at least one datum record is received via an agent interface from an agent, wherein each activity record of the multiple activity records identifies the agent associated with an activity of the activity record and the at least one datum record that the activity record supports.

\* \* \* \* \*